United States Patent
Yamaguchi et al.

(10) Patent No.: US 6,665,118 B2
(45) Date of Patent: Dec. 16, 2003

(54) REAR-PROJECTION SCREEN AND REAR-PROJECTION IMAGE DISPLAY

(75) Inventors: Hiroshi Yamaguchi, Osaka (JP); Kenichi Ikeda, Osaka (JP); Osamu Sakai, Osaka (JP); Toru Tatsumi, Kyoto (JP); Satoshi Aoki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/941,385

(22) Filed: Aug. 28, 2001

(65) Prior Publication Data

US 2002/0080483 A1 Jun. 27, 2002

(30) Foreign Application Priority Data

Aug. 30, 2000 (JP) ......................................... 2000-261680
Feb. 19, 2001 (JP) ......................................... 2001-041997

(51) Int. Cl.[7] .............................................. G03B 21/60
(52) U.S. Cl. ..................... 359/453; 359/455; 359/460; 359/599; 353/74; 353/77
(58) Field of Search ................................. 359/355, 357, 359/448, 453, 455, 456, 457, 460, 619, 620

(56) References Cited

U.S. PATENT DOCUMENTS 5,477,380 A * 12/1995 Watanabe et al. ........... 359/457
5,590,943 A * 1/1997 Yoshida et al. ............... 353/74
5,932,342 A * 8/1999 Zeira et al. .................. 428/327
6,002,464 A * 12/1999 Fujisawa et al. ............ 349/112
6,169,633 B1 * 1/2001 Watanabe .................... 359/626
6,256,145 B1   7/2001 Kono et al.
6,310,722 B1 * 10/2001 Baek ............................ 359/455
6,400,504 B2 * 6/2002 Miyata ........................ 359/453

FOREIGN PATENT DOCUMENTS

| EP | 732 615 | 9/1996 |
| JP | 8-313865 | 11/1996 |
| JP | 10-293361 | 11/1998 |
| JP | 10-293362 | 11/1998 |
| JP | 11-338057 | 12/1999 |

* cited by examiner

*Primary Examiner*—Ricky Mack
*Assistant Examiner*—Brandi N Thomas
(74) *Attorney, Agent, or Firm*—Merchant & Gould, P.C.

(57) ABSTRACT

A rear-projection screen 3, including at least a lenticular lens sheet 32 and a Fresnel lens sheet 31, is configured so that the lenticular lens sheet 32 contains, in a base material thereof made of a resin, light diffusing microparticles made of a resin having a refractive index different from a refractive index of the base material, and the light diffusing microparticles satisfy $0.5\ \mu m \leq \Delta N1 \times d1 \leq 0.9\ \mu m$, where $\Delta N1$ represents a difference between a refractive index of the light diffusing microparticles and a refractive index of the base material of the lenticular lens sheet, and $d1$ represents an average particle diameter of the light diffusing microparticles. With this, a rear-projection screen with small wavelength dependency of diffusion characteristics can be provided utilizing only resins with general properties.

12 Claims, 17 Drawing Sheets

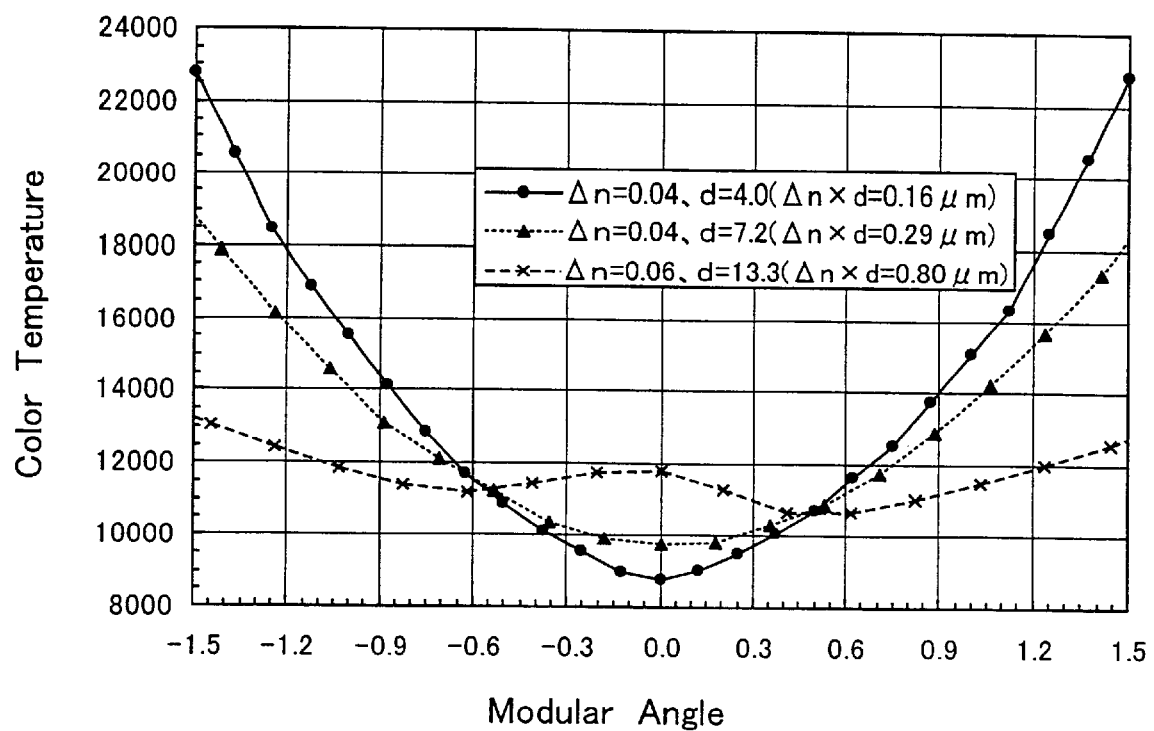
F I G. 1

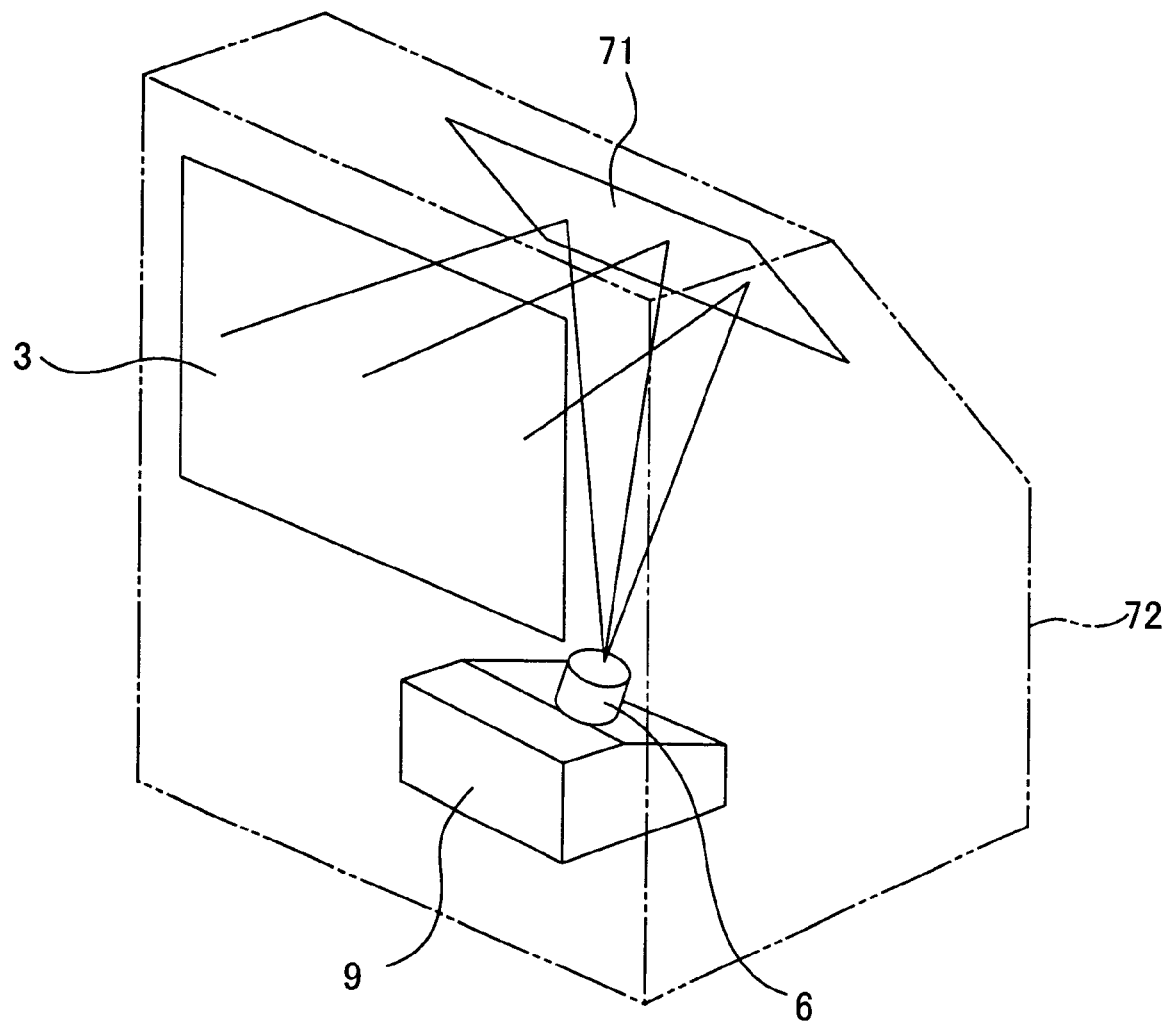
F I G. 5

REAR-PROJECTION SCREEN AND REAR-PROJECTION IMAGE DISPLAY

BACKGROUND OF THE INVENTION

1. Field of the Invention

Both of Aspects I and II of the present invention relates to a rear-projection screen and a rear-projection display (rear-projection image display device) in which the rear-projection screen is used.

2. Related Background Art

Aspect I of the Present Invention

Needs for large screens have grown, mainly in the field of television picture tubes recently, and rear-projection displays have gained a spotlight as suitable for such a large screen. Generally, a CRT is used as an image source for the rear-projection display. Further, a type in which a spatial modulation element such as a liquid crystal element is used for advantages of lightness and compactness has been proposed and drawn attention.

First of all, the following description will depict a type in which a CRT is used as an image source. FIG. 6 is a view schematically illustrating the basic configuration of the same.

In this display, images are formed by single-color CRTs 1 (1R, 1G, and 1B) for the three main colors, respectively, and are enlarged and projected by projection lenses 2 (2R, 2G, and 2B) corresponding to the same, respectively, so as to be superimposed on a screen 3. Here, the reference codes R, G, and B correspond to red, green, and blue, respectively. As shown in the figure, light that is divergent from the center to the periphery and that partially has a sharp directivity is incident on the screen 3 disposed at the image formation plane. Besides, red, green, and blue lights incident on respective parts have angles differing from each other, respectively. The screen 3 is required to arrange such projected lights appropriately so as to allow good image recognition.

Minimum image observation is enabled by using a simple light diffusing sheet as the screen 3. Since the projected light is incident thereto divergently as described above, however, light at the peripheral part has outward directivity since the projected light is incident divergently thereon. Therefore, the brightness of the screen is remarkably uneven. For instance, the screen has an extremely low luminance at the periphery as compared with a luminance at the center when observed from the front, and has a high luminance at an end closer to the observer and a low luminance at an end farther from the observer when observed diagonally.

To avoid such unevenness, generally a Fresnel lens sheet 31 is provided on a light-projected side of a diffusing sheet. The Fresnel lens sheet 31 functions to convert the projected light divergently incident from the projection lenses 2 on the screen 3 into substantially parallel rays. By this function, green projected light is converted into parallel rays perpendicular to the screen surface, while blue and red projected lights are converted into parallel rays that are vertically parallel with each other and that have certain set angles, respectively, with respect to the normal line of the screen surface in any horizontal plane. In the case where the projected light simply is diffused in this state, the green projected light leaves the screen symmetrically with respect to the normal direction of the screen surface, while the red and blue projected lights leave the screen asymmetrically, thereby causing colors of the screen to change depending on the viewing direction. This phenomenon is called "color shade" and degrades the image quality.

To cope with this, a lenticular lens sheet 32 that has a special configuration having black stripes (BS) and pairs of lenticular lenses (this configuration is hereinafter referred to as "BS Paired-Lenticular-Lens Structure") is used so as to diffuse projected light with a sharp directivity so as to make the same observable at various angles, and to suppress color shift. The function thereof is depicted with reference to FIG. 7.

FIG. 7 illustrates a cross section of the lenticular lens sheet 32 in the horizontal direction, and ray trajectories of green projected light and red projected light are indicated with a solid line (G) and a broken line (R), respectively. As shown in the figure, light-incident-side lenticular lenses 321 and light-exiting side lenticular lenses 322 that are paired are provided so that the lenses of each pair share the same optical axis. By doing so, an exiting angle of the red light that has been incident diagonally is corrected so that diffusion symmetric to the normal direction of the screen is realized, as is with the green light, whereby the color shift is suppressed. Furthermore, because light passes through limited portions of the light-exiting surface due to the light collecting function of the light-incident-side lenticular lens 321, it is possible to provide light absorbing layers 323 at light non-transmission portions of the light-exiting surface. Since the light absorbing layers are black in color and are provided in a stripe form, they are called black stripes, abbreviated as BS, and function significantly to reduce the diffusing reflection of external light incident on the screen in a bright environment, thereby improving the contrast.

It should be noted that generally the lenticular lens is formed so that its lengthwise direction is directed in the vertical direction, and the refraction by the lenticular lens affects only in the horizontal direction, and does not contribute to diffusion in the vertical direction. Therefore, light diffusing microparticles made of a material having a refractive index different from that of a base are dispersed inside the lenticular lens sheet so that light is diffused in the vertical direction. At interfaces between the base and the light diffusing microparticles, light rays are refracted depending on a refractive index difference Δn according to the Snell's law, thereby being diffused isotropically. This refracting function is more intense as the difference between the refractive index of the base and that of the light diffusing microparticles is greater, which means that light is diffused more as the difference between the refractive index of the base and that of the light diffusing microparticles is greater.

Generally, a material tends to have a greater refractive index at a shorter wavelength, and this is called the wavelength dispersion of the refractive index, which is represented by an Abbe constant νd. The dispersion increases and the Abbe constant νd decreases as a material has a higher refractive index. The relationship between the refractive index nd of a typical material as an optical resin material and the Abbe constant νd is shown in Table 1 and FIG. 10.

TABLE 1

| MATERIAL | POPULAR NAME, TRADE NAME | REFRACTIVE INDEX nd | ABBE CONSTANT νd |
|---|---|---|---|
| PMMA | Acryl | 1.492 | 57.6 |
| Polystyrene | Styrol | 1.590 | 30.9 |
| Polycarbonate | PC | 1.585 | 29.9 |
| Allyl Glycol Carbonate | CR39 | 1.504 | 57.8 |
| Copolymer Styrene Methacrylate | Zeron ® | 1.533 | 42.4 |

TABLE 1-continued

| MATERIAL | POPULAR NAME, TRADE NAME | REFRACTIVE INDEX nd | ABBE CONSTANT vd |
|---|---|---|---|
| Copolymer Styrene Acrylonitryle | Lustran ® | 1.569 | 35.7 |
| Polymethyl Pentane | TPS ® | 1.466 | 56.4 |

Note: ® means Registered Trademark.

Thus, in order that a base and light diffusing microparticles are made of materials selected from generally-used transparent resin materials so that they have a refractive index difference Δn therebetween, unavoidably a high-refractive-index high-dispersion material and a low-refractive-index low-dispersion material are combined. Consequently, the refractive index difference Δn also is made wavelength-dependent, and hence, the refractive index difference Δn tends to increase as the wavelength is shorter.

In the case where the combination of the light diffusing microparticles and the base is such a combination of general materials, the refractive index difference Δn increases as the wavelength is shorter, thereby leading to significant diffusion. As a result, the diffusion exhibits a wavelength-dependency such that the diffusion of blue light having a shorter wavelength exceeds the diffusion of red light having a longer wavelength.

As the base material of the lenticular lens sheets, a transparent resin is used, for instance, polymethyl methacrylate (PMMA) with a refractive index of approximately 1.49, or an MS resin (copolymer of styrene and methyl methacrylate (MMA)) with a refractive index of approximately 1.52. In such a case, beads, each in a pearl form, made of an MS resin with a refractive index that is approximately 0.02 to 0.07 greater than that of the base material, are used often. The refractive index of the MS resin material used for the base material and the light diffusing microparticles can be adjusted by adjusting a mix proportion of MMA and styrene. Since the refractive index of MMA is approximately 1.49 and the refractive index of styrene is approximately 1.59, the refractive index of the MS resin can be adjusted in a range of 1.49 to 1.59. The wavelength dispersion of the MS resin increases as the refractive index nd increases (the Abbe constant vd decreases as the refractive index nd increases), and this agrees with the correlation line shown in FIG. 10.

In the case where the lenticular lenses are made of materials arranged as above, the refractive index difference Δn between the base and the light diffusing microparticles is made wavelength-dependent for the aforementioned reasons. Therefore, the refractive index difference Δn increases, thereby resulting in significant diffusion, as the wavelength is shorter. Consequently, the diffusion is made wavelength-dependent, for instance, the diffusion of blue light having a short wavelength is more significant than the diffusion of red light having a long wavelength. Since light with a sharp directivity is incident on a rear-projection screen in particular, a remarkable color variation takes place in which the screen is reddish when observed from the front and becomes more bluish as the observation angle increases (as observed more diagonally). It should be noted that in the case of a rear-projection screen including lenticular lens sheets, the color variation is remarkable in the vertical direction, since the diffusion in the horizontal direction is achieved by the refracting function of the lenticular lenses.

The color variation depending on the observation angle stems from a cause different from that of the color shift due to the horizontal arrangement of the image sources of the three principal colors, and cannot be suppressed by the aforementioned BS Paired-Lenticular-Lens Structure.

Another configuration of the rear-projection screen is, as shown in FIG. 8, a configuration in which the light diffusing microparticles are not dispersed inside the lenticular lens sheet 32 but a light diffusing sheet 33 is provided on the image-observed side of the lenticular lens sheet 32. This configuration reduces optical loss that is caused by the diffusion of light inside the lenticular lens sheet 32 and the incidence of the same on the black stripes, thereby improving the efficiency and suppressing the color shift in the horizontal direction.

In this configuration also, the above-described color variation in the vertical direction due to the wavelength characteristics of the light diffusing microparticles dispersed in the light diffusing sheet 33 and the resin material used for the base tends to occur, as in the case where the light diffusing microparticles are dispersed inside the lenticular lens sheet.

Furthermore, in the type in which light from a lamp 4 is modulated by using a spatial modulation element 5 like a liquid crystal panel as an image source as schematically illustrated in FIG. 9, a single projection lens 6 is used for image projection by superimposing three principal-color images before the projection lens 6. Therefore, the aforementioned color shift correction is unnecessary. In this case, it also is proposed to use a sheet that is obtained by bonding a transparent lenticular lens sheet 34 and a light diffusing sheet 33 with each other with a transparent adhesive. The transparent lenticular lens sheet 34 has a flat light-exiting surface and is provided with black stripes (BS) on its light non-transmission portions on the light-exiting surface. In this configuration, the external light incident on the light diffusing sheet 33 is absorbed by the black stripes effectively before being diffused and reflected on its rear surface. Therefore, the contrast in a bright environment is improved.

In this configuration, the color shift in the horizontal direction does not take place, but the drawback of the color variation in the vertical direction that tends to occur when a common resin material is used still remains unsolved.

As a measure for reducing the wavelength dependency of the diffusion, a technique of combining plural kinds of light diffusing microparticles that cancel their respective wavelength dependencies of the diffusion characteristics, has been proposed; the light diffusing microparticles are, for instance, "light diffusing microparticles of a higher refractive index and high dispersion than those of the base, and light diffusing microparticles of a higher refractive index and lower dispersion than those of the base" (JP11(1999)-338057A). This technique allows the overall wavelength dependency of the diffusion to be suppressed, thereby realizing a configuration characterized in that the color variation depending on the observation angle is small.

The rear-projection screen sometimes is configured so that light diffusing microparticles are dispersed in a transparent base, not in order to secure an angle of visibility as described above, but in order to reduce the glaring of the screen, which is called scintillation. The scintillation is remarkable particularly in the type as shown in FIG. 9 in which the spatial modulation element 5 such as a liquid crystal panel is used. The reason for this is as follows: the projected light reaching the screen 3 has a particularly sharp directivity, because the magnification is high due to the small size of the image source as compared with the CRT projection type, and hence the projection lens 6 used therein has a great F number. In this case, the light diffusing microparticles are dispersed in the Fresnel lens sheet 31. By using this type, it is possible to reduce speckle or scintillation.

As disclosed by JP11(1999)-338057A, the use of plural kinds of light diffusing microparticles that cancel the respective dispersion wavelength-dependencies decreases the dispersion wavelength-dependency of the light diffusing sheet. In this case, however, as a material for one of the kinds of the light diffusing microparticles, a material of a higher refractive index and lower dispersion than those of the base is needed. In the case where resins are used as the base and the light diffusing microparticle material, polycarbonate or the like, apart from MMA and styrene, may be used as a transparent material applicable for an optical purpose. These resin materials, however, tend to exhibit higher dispersion as the refractive index is higher, and hence, the aforementioned combination is infeasible.

To obtain the aforementioned combination, there is no practical alternative other than the use of a transparent glass material of a higher refractive index and lower dispersion than those of a resin for forming a light diffusing microparticles of a higher refractive index and lower dispersion than those of a resin base. However, in the case where a light diffusing sheet or a rear-projection screen is produced using the light diffusing microparticles made of a glass material, damage to a cutting edge upon cutting the sheet or screen increases as compared with the case where light diffusing microparticles made of a resin material are used. Besides, there is a problem of a higher manufacturing cost as compared with the case where generally-used resin-made light diffusing microparticles are used.

In the case where light diffusing microparticles are dispersed in a Fresnel lens sheet to reduce scintillation, side effects such as the impairment of the resolving power and the decrease in the efficiency are produced. The impairment of a resolving power is caused when light diffused at one point in the Fresnel lens sheet spreads by the time it reaches the lenticular lens sheet, then again is diffused by the lenticular lens sheet. The resolving power decreases in proportion to a diffusing characteristic rendered to the Fresnel lens sheet and a distance between two diffusing elements. On the other hand, the efficiency is impaired because components lost to absorption by BS provided on the light-exiting surface of the lenticular lens sheet increase due to diffusion at the Fresnel lens sheet. The decrease in the efficiency becomes more remarkable as the diffusion at the Fresnel lens sheet becomes more significant.

Aspect II of the Present Invention

Needs for large screens have grown mainly in the field of television picture tubes recently, and rear-projection displays have gained a spotlight as suitable for such a large screen. Generally, a CRT is used as an image source for the rear-projection display, but a device making use of light modulation by a liquid crystal panel or the like has been developed and is expected to realize further lightness and compactness. A basic configuration of the same is shown schematically in FIG. 16.

Light emitted from a lamp 4 is subjected to spatial modulation by the liquid crystal panel 5 so that an image is formed, and the image is enlarged and projected by a projection lens 6. It should be noted that an actual device generally is provided with three liquid crystal panels to obtain color display, and in this case, the device has a complex structure including a color separation optical system for separating the light from the lamp 4 into red, green and blue components, a color synthesizing optical system for synthesizing lights that has passed through the three liquid crystal panels, and the like. However, these are omitted herein.

Furthermore, examples of similar types making use of spatial modulation include a type utilizing a reflective liquid crystal element as a modulating element, and a type utilizing a multiplicity of micromirrors whose angles are variable (micromirror device).

Light that is divergent from the center to the periphery and that partially has a sharp directivity is incident on the rear-projection screen 3 disposed at the image formation plane. The degree of the directivity is represented by a projection directivity angle θ, which is expressed as:

$$\theta = \tan^{-1}[1/\{2 \times F \times (M+1)\}] \approx 1/\{2 \times F \times (M+1)\}$$

where M represents a projection magnifying power M and F represents an F number of the projection lens.

It should be acknowledged that in a device utilizing a CRT as an image source, the projection magnifying power M for a display with a diagonal of the 50-inch order is approximately 10 since a CRT with an about 5-inch diagonal is used, and the F number is set as small as approximately 1 so that diffused light from a fluorescent body is captured. Consequently, a projection directivity angle θ of approximately 0.05 (about 3°) is obtained.

On the other hand, in a type utilizing an image modulating element such as a liquid crystal panel, the F number of the projection lens is as great as 3 since an element with a diagonal of approximately 1 inch is used and illuminating light with a relatively high directivity needs to be used in view of the characteristics of the element. Therefore, the projection directivity angle θ is as small as approximately 0.003 (about 0.2°), and projected light incident on the screen has an extremely strong directivity.

The screen 3 functions to arrange such projected light appropriately so as to enable good image recognition.

Even in the case where a simple diffusing means (diffusing plate) is used as the screen 3, the minimum image observation is enabled. However, since the projected light is incident divergently as described above, the light has an outward directivity at the peripheral part, thereby causing remarkable unevenness in the brightness of the screen. For instance, the screen 3 has an extremely low luminance at the periphery as compared with a luminance at the center when observed from the front, and it has a high luminance at an end closer to the observer and a low luminance at an end farther from the observer when observed diagonally.

To avoid such unevenness, generally a Fresnel lens sheet 35 is provided on a light-projected side of a diffusing means.

The Fresnel lens sheet 35 functions to convert the projected light divergently incident from the projection lens 6 on the screen 3 into parallel rays with a principal directivity that is substantially perpendicular to the screen surface.

Thus, if the light is diffused after having been converted into light with a principal directivity perpendicular to the screen surface at any part of the screen, it is possible to obtain substantially uniform brightness throughout the whole screen, irrespective of the direction in which the screen is viewed.

Furthermore, generally a laminated lenticular lens sheet 36 is used as the diffusing means, instead of a simple isotropic diffusing plate.

Considering the observation range, the image recognition at various angles need to be achieved as to the observation range in the horizontal direction, whereas the image recognition only in the standing state and in the sitting state suffices as to the observation range in the vertical direction.

Therefore, it is possible to provide an evenly bright image by effectively allocating light to necessary regions by anisotropic diffusion. The laminated lenticular lens sheet 36 provides the anisotropic diffusion.

The laminated lenticular lens sheet 36 is composed of a BS (black stripe)—provided lenticular lens film 362, and a diffusing sheet 361 obtained by integrally providing a light diffusing layer 3612 and a transparent layer 3611. As shown in FIG. 17, the lenticular lens film 362 has lenticular lenses 3621 provided on a light-incident-side surface thereof whose lengthwise direction is directed in the vertical direction. The lenticular lens film 362 has a thickness set so that the focus position of each lenticular lens 3621 substantially coincides with the light-exiting surface of the film. Therefore, the projected light incident on the lenticular lens film 362 is converged in the vicinity of the light-exiting surface, and then, exits therefrom. On the light-exiting surface of the lenticular lens film 362, light non-transmission regions that the projected light does not pass through and whose lengthwise direction is directed in the vertical direction are provided in a stripe form. On the light non-transmission regions, light absorbing layers (black stripes: BS) 3622 are provided in a stripe form. The light-exiting surface of the BS-provided lenticular lens film 362 and the diffusing-layer-3612-side surface of the diffusing sheet 361 are made to adhere to each other with a transparent adhesive or a transparent bonding material 363.

As shown in FIG. 17, an array pitch P1 of the lenticular lenses 3621 on the lenticular lens film 362 preferably is as small as possible so that the moiré effect caused by the lenses and the pixels is suppressed and that a high resolving power is obtained. In order to decrease the pitch P1, it is necessary to decrease the pitch at which the black stripes 3622 are provided on the light non-transmission regions on the light-exiting surface of the lenticular lens film. Conventionally it has been difficult to provide the black stripes precisely at a fine pitch on the light non-transmission regions. Now, however, a technique of selective exposure by making use of the light collecting function of the lenticular lenses has been developed, so that a fine pitch at a level of not more than 0.2 mm is obtained. In this case, the lenticular lens film 362 has a thickness t1 of not more than 0.3 mm so as to obtain a diffusion angle required of the lenticular lens film 362 and to collect light onto the light-exiting surface.

The diffusing sheet 361 is made of, as a base, a transparent material such as polymethyl methacrylate (PMMA), or an MS resin (copolymer of styrene (refractive index: 1.59) and methyl methacrylate (MMA, refractive index: 1.49)), and only in the diffusing layer 3612 part in the diffusing sheet 361, the light diffusing microparticles having a refractive index slightly greater than the refractive index of the transparent material forming the foregoing base are dispersed. The thickness of the diffusing sheet 361 generally is about 2 mm so as to obtain a mechanical strength that allows the whole laminated lenticular lens sheet 36 to be maintained stably, while the thickness of the diffusing layer 3612 and the thickness of the transparent layer 3611 are set to about 0.1 mm to 0.2 mm, and about 1.0 mm to 1.8 mm, respectively.

It should be noted that it is possible to obtain an identical diffusing function by not making the diffusing sheet in a two-layer structure, but dispersing the diffusing material throughout the thickness thereof of approximately 2 mm. This, however, is inferior to the above-described two-layer structure with respect to the resolving power, and particularly in the case where a great diffusion characteristic is imparted so that the angle of visibility is increased, significant deterioration of the resolving power tends to occur.

With the configuration as above, the projected light that has been converted by the Fresnel lens sheet 35 into substantially parallel light is diffused to a relatively wide range in the horizontal direction by the synergism of the refractive effect of the lenticular lenses 3621 and the light diffusing microparticles in the diffusing layer 3612, while it is diffused in a relatively narrow range in the vertical direction only by the effect of the light diffusing microparticles in the diffusing layer 3612. Thus, the aforementioned anisotropic diffusion is realized.

As to the rear-projection display in which a light modulation element as described above is used, a phenomenon called scintillation has emerged, which was not apparent in a device utilizing a CRT as an image source. The scintillation is a phenomenon in which glaring occurs on a screen due to minute light and dark patterns, and it also is called speckle.

The reason why scintillation particularly becomes apparent in the rear-projection display utilizing a light modulation element is that the directivity of the projected light incident on the screen is significantly more intense as compared with that of a display utilizing a CRT as described above, thereby producing high spatial coherence that leads to mutual interference of light diffused by the light diffusing microparticles.

JP8(1996)-313865A proposes, as a technique for suppressing scintillation, to provide two layers of diffusing elements with a certain set distance therebetween. In this case, generally, the laminated lenticular lens sheet in which generally the light diffusing microparticles are dispersed is utilized as the diffusing element, and in addition to that, the Fresnel lens sheet 35, which is a basic element of the screen like the laminated lenticular lens sheet, is utilized also as the diffusing element.

In JP10(1998)-293361A and JP10(1998)-293362A, an appropriate diffusion characteristic to be imparted to the Fresnel lens sheet is defined with a haze value.

Thus, the dispersion of the light diffusing microparticles not only in the laminated lenticular lens sheet 36 but also in the Fresnel lens sheet 35 makes it possible to suppress scintillation. At the same time, however, it produces unfavorable side effects as a rear-projection display.

One of the side effects is as follows: among the light diffused by the Fresnel lens sheet 35, components incident on the laminated lenticular lens sheet 36 at relatively great angles are absorbed by the black stripes 3622 provided on the lenticular lens film 362, thereby being lost.

Scintillation is suppressed more effectively as the diffusion characteristic imparted to the Fresnel lens sheet 35 increases, but the aforementioned absorption loss increases as the diffusion characteristic increases.

Another side effect is a drawback in that the resolving power significantly deteriorates when a gap is produced between the Fresnel lens sheet 35 and the laminated lenticular lens sheet 36.

The Fresnel lens sheet 35 and the laminated lenticular lens sheet 36 tend to warp in response to changes in the ambient temperature and moisture, since they usually are made of a resin. A technique of previously making the both warped so as to cause the same to adhere closely and fixing the peripheral part of the same is available to prevent a gap from being produced between the Fresnel lens sheet 35 and the laminated lenticular lens sheet 36 due to such environmental changes. With the use of such a technique, however, it still is difficult to completely prevent such a gap from being produced under readily conceivable environmental changes.

Furthermore, in the case where the laminated lenticular lens sheet 36 and the Fresnel lens sheet 35 are thus warped previously, the screen surface is warped in a state of being mounted on the device. In such a state, the projection magnifying power varies depending on a position, and such a projection magnifying power distribution causes a projected image to be deformed. Besides, the reflection image of external light also is caused to have deformation, which makes an undesirable appearance, particularly when the device is turned off.

SUMMARY OF THE INVENTION

Aspect I of the Present Invention

Therefore, with the foregoing in mind, it is a first object of the aspect I of the present invention to provide a rear-projection screen with small wavelength dependency of diffusion characteristics, which can utilize resin materials with general properties, with the aforementioned problems being solved.

It is a second object of the aspect I of the present invention to provide a rear-projection screen in which scintillation is suppressed while the side effects caused by the diffusion by the Fresnel lens sheet are suppressed.

It also is a still another object of the aspect I of the present invention to provide a rear-projection display in which the foregoing rear-projection screen is used.

To achieve the foregoing first object, in a rear-projection screen according to the aspect I of the present invention, light diffusing microparticles dispersed inside as a diffusing element are arranged so that the product of a refractive index difference Δn from the base material and an average particle diameter d, that is, Δn×d, is in a range of 0.5 to 0.9. This makes it unnecessary to use light diffusing microparticles made of a material with specific characteristics, for instance, a higher refractive index and high dispersion than those of the base material, or a higher refractive index and lower dispersion than those of the base material. This allows light diffusing microparticles made of a general resin material to be used for achieving diffusion characteristics with small wavelength dependency.

Furthermore, to achieve the foregoing second object, in a rear-projection screen according to the aspect I of the present invention, light diffusion by light diffusing microparticles dispersed in a Fresnel lens sheet is made smaller than light diffusion by light diffusing microparticles dispersed in a light diffusing sheet or a lenticular lens sheet, and the light diffusing microparticles dispersed in the Fresnel lens sheet are arranged so that the aforementioned Δn×d is in a range of 0.1 to 0.3. This allows scintillation to be suppressed effectively, while reducing side effects such as a decrease in the resolving power, optical loss, etc.

Furthermore, since a rear-projection display according to the aspect I of the present invention is provided with the rear-projection screen according to the aspect I of the present invention, an image display that undergoes a minimum of color tone variation depending on an observation direction, exhibits a minimum of scintillation and excels in resolution can be achieved.

Aspect II of the Present Invention

It is an object of the aspect II of the present invention to provide a rear-projection screen in which the aforementioned problems are solved, scintillation is minimized, loss due to absorption by black stripes is reduced, and a resolving power is not significantly impaired in response to ambient changes, and also to provide a rear-projection display in which the foregoing rear-projection screen is used.

To achieve the foregoing object, a rear-projection display and a rear-projection screen according to the aspect II of the present invention are configured so that a diffusing layer provided in a laminated lenticular lens sheet is positioned apart from a focal plane of a lenticular lens sheet and in a predetermined range that is effective for suppressing scintillation and reducing a decrease in the resolving power. Furthermore, preferably a transparent Fresnel lens sheet containing substantially no diffusing material is used.

More specifically, a first rear-projection display according to the aspect II of the present invention includes a spatial modulation element, and a rear-projection screen on whose surface on a light-projected side an image formed by the spatial modulation element is projected so that the image is observed from an image-observed side opposite to the light-projected side. In the rear-projection display, the rear-projection screen includes a first screen element for converting projected light from the spatial modulation element into substantially parallel light, and a second screen element for diffusing the substantially parallel light. The second screen element includes a lenticular lens array that is provided on the surface on the light-projected side and whose lengthwise direction is directed in a vertical direction, a diffusing layer provided on the image-observed side to the lenticular lens array, and a transparent layer provided between the lenticular lens array and the diffusing layer. In this, a distance t1 between a light-projected-side surface of the diffusing layer and a focal plane of the lenticular lens array satisfies Formula II-1 below, and a distance t2 between an image-observed-side surface of the diffusing layer and the focal plane of the lenticular lens array satisfies Formula II-2 below:

$$t1 \geq f1 \qquad \text{Formula II-1}$$

$$t2 \leq f1 \times Pg/P1 \qquad \text{Formula II-2}$$

where f1 represents a distance between a valley of the lenticular lens array and the focal plane, Pg represents a pixel pitch on the screen, and P1 represents an array pitch of the lenticular lens array.

With the foregoing first rear-projection display, scintillation can be reduced by satisfying Formula II-1, and a high resolving power can be obtained by satisfying Formula II-2.

Furthermore, a second rear-projection display according to the aspect II of the present invention may be configured so that the distance t2 between an image-observed-side surface of the diffusing layer and the focal plane of the lenticular lens array satisfies Formula II-3 below, in place of Formula II-2 for the first rear-projection display:

$$t2 \leq Pg/2/\tan(\gamma i) \qquad \text{Formula II-3}$$

where γi represents an in-layer equivalent angle in the transparent layer that is obtained by converting an observation angle γ at which a luminance of ⅒ of that in a normal direction is obtained due to diffusion caused by the diffusing layer, and is expressed as Formula II-4 below:

$$\gamma i = a\sin(\sin(\gamma)/n) \qquad \text{Formula II-4}$$

where n represents a refractive index of the transparent layer.

With the foregoing second rear-projection display, scintillation can be reduced by satisfying Formula II-1, and a high resolving power can be obtained by satisfying Formula II-3.

Next, a first rear-projection screen according to the aspect II of the present invention is a rear-projection screen on whose surface on a light-projected side an image formed by a spatial modulation element is projected so that the image is observed from an image-observed side opposite to the light-projected side. The rear-projection screen includes a first screen element for converting projected light from the spatial modulation element into substantially parallel light, and a second screen element for diffusing the substantially parallel light. The second screen element includes a lenticular lens array that is provided on the surface on the light-projected side and whose length-wise direction is directed in a vertical direction, a diffusing layer provided at the image-observed side of the lenticular lens array, and a transparent layer provided between the lenticular lens array and the diffusing layer. In this, a distance t1 between a light-projected-side surface of the diffusing layer and a focal plane of the lenticular lens array satisfies Formula II-1 below, and a distance t2 between an image-observed-side surface of the diffusing layer and the focal plane of the lenticular lens array satisfies Formula II-5 below:

$$t1 \geq f1 \quad \text{Formula II-1}$$

$$t2 \leq f1 \times P1 \times 0.7 \quad \text{Formula II-5}$$

where f1 represents a distance between a valley of the lenticular lens array and the focal plane, and P1 represents an array pitch of the lenticular lens array, the unit of t1 is according to that of f1, and the unit of t2 is millimeters.

With the foregoing first rear-projection screen, scintillation can be reduced by satisfying Formula II-1, and a high resolving power can be obtained by satisfying Formula II-5.

Furthermore, a second rear-projection screen according to the aspect II of the present invention may be configured so that the distance t2 between an image-observed-side surface of the diffusing layer and the focal plane of the lenticular lens array satisfies Formula II-6 below, in place of Formula II-5 for the first rear-projection screen:

$$t2 \leq 0.35/\tan(\gamma i) \quad \text{Formula II-6}$$

where f1 represents a distance between a valley of the lenticular lens array and the focal plane, and $\gamma i$ represents an in-layer equivalent angle in the transparent layer that is obtained by converting an observation angle $\gamma$ at which a luminance of 1/10 of that in a normal direction is obtained due to diffusion caused by the diffusing layer, and is expressed as Formula II-7 below:

$$\gamma i = a\sin(\sin(\gamma)/n) \quad \text{Formula II-7}$$

where n represents a refractive index n of the transparent layer, and the unit of t1 is according to that of f1, and the unit of t2 is millimeters.

With the foregoing second rear-projection screen, scintillation can be reduced by satisfying Formula II-1, and a high resolving power can be obtained by satisfying Formula II-6.

BRIEF DESCRIPTION OF THE DRAWINGS

FIG. 1 is a graph showing the relationship between an observation angle of a light diffusing sheet and a color temperature.

FIG. 5 is a perspective view of a rear-projection display according to another embodiment of the aspect I of the present invention.

DETAILED DESCRIPTION OF THE INVENTION

Aspect I of the Present Invention

First of all, before describing each embodiment, the following description will depict matters that the present invention relies on. The inventors of the present invention produced screens, using samples of light diffusing sheets in which light diffusing microparticles with various refractive indices and various particle diameters were used, and mounted each screen on a rear-projection display so as to examine in detail the characteristics of the screens. Consequently, the inventors found that even in the case where a kind of light diffusing microparticles made of a material whose refractive index wavelength dispersion is different from that of a base is used alone, the wavelength dependency of the dispersion characteristic can be suppressed by optimizing the particle diameter and refractive index of the microparticles.

For forming the samples of the light diffusing sheets, MMA with a refractive index of 1.49 was used as a base material, and a copolymer resin of MMA and styrene (MS resin) was used for forming the light diffusing microparticles. Nine kinds of light diffusing microparticles having refractive indices in a range of 1.52 to 1.55 (refractive index difference Δn: 0.03 to 0.06) and average particle diameters in a range of 4 μm to 13.3 μm were produced by adjusting the mix proportion of components of the MS resin.

Figure 9:
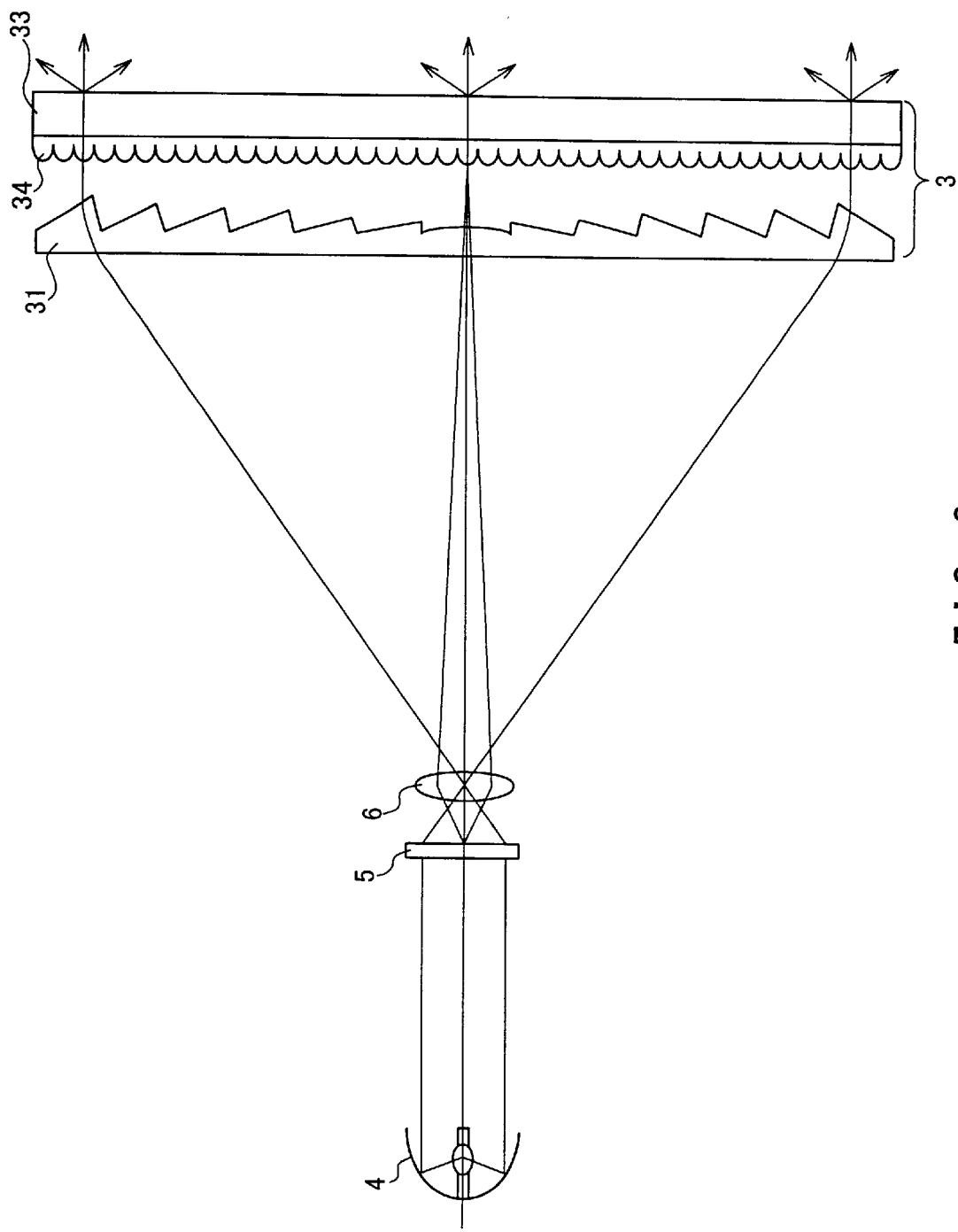
FIG. 9 is a view illustrating a state of a rear-projection screen according to still another embodiment of the aspect I of the present invention when used in a rear-projection display of the spatial modulation type.

A screen 3 was configured as shown in FIG. 9, using a light diffusing sheet thus obtained, and the screen 3 was mounted on a rear-projection display and was made to display a white display so that luminances and color temperatures of display light at the center portion of the screen were measured at angles varied in the vertical directions with respect to a front direction (normal direction) as a reference.

As described above, light with an extremely high directivity is incident on the screen 3. Since such light is collimated by the Fresnel lens sheet 31 and then diffused only in the horizontal direction by the lenticular lens sheet 34, the light is incident on the light diffusing sheet 33 in a state of being diffused only in the horizontal direction and still maintaining the sharp directivity in the vertical direction.

In the foregoing configuration, the Fresnel lens sheet 31 and the lenticular lens sheet 34 do not contain light diffusing microparticles, and hence are transparent. Therefore, since only the light diffusing microparticles mixed in the light diffusing sheet 33 serve as the diffusing factor in the vertical direction, the diffusion characteristic of the light diffusing microparticles is evaluated by the foregoing measurement.

It should be acknowledged that when a white diffusing plate that is considered to perform substantially complete reflection was used in place of the rear-projection screen and reflected light was measured, a uniform reflection luminance and a uniform color temperature that did not vary with a measurement angle were detected. The color temperature in that case was approximately 11000 K.

Figure 2:
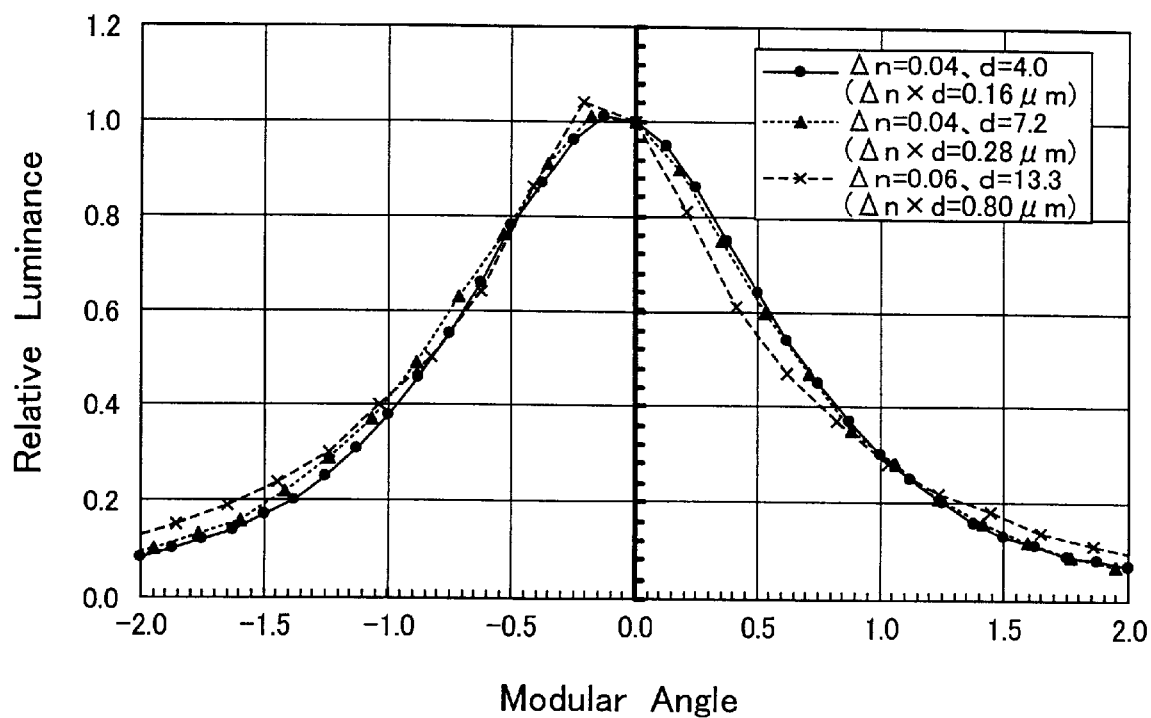
FIG. 2 is a graph showing the relationship between an observation angle of a light diffusing sheet and a relative luminance.

FIGS. 1 and 2 show the outcomes of the evaluation of the color temperatures and the luminances of light diffusing sheets utilizing three kinds of light diffusing microparticles with refractive indices of 1.53 (Δn=0.04), 1.53 (Δn=0.04), and 1.55 (Δn=0.06), and average particle diameters of 4.0 μm (Δn×d=0.16 μm), 7.2 μm (Δn×d=0.29 μm), and 13.3 μm (Δn×d=0.80 μm), respectively, selected from among the aforementioned nine kinds of light diffusing microparticles.

In FIGS. 1 and 2, the horizontal axis indicates a measurement angle (modular angle) modulated according to an angle at which the luminance declines to ⅓ of a peak value of the same (referred to as a β angle, which is regarded as representing an approximately practical visual field). Thus, by using the modular angle, it is possible to compare diffusion patterns and color temperature characteristics, independently from an absolute quantity of diffusion.

In the case where light diffusing microparticles satisfying Δn×d=0.16 were used, the color temperature when observed in the normal direction of the screen was low, and the color temperature rose as the observation angle (angle between the observing direction and the normal line of the screen) increased (FIG. 1). This shows that blue light rays with a short wavelength were diffused more than red light rays with a long wavelength were diffused, and hence, the red light rays were distributed in the vicinity of the normal direction at a relatively high proportion, while the proportion of the blue light rays increased as the observation angle increased. This substantially agrees with an outcome of simulation on the assumption that the wavelength dependency of diffusion occurs according to the wavelength dependency of Δn. Besides, the diffusion pattern was found to excel in the diffusion to the vicinity of the normal direction, and had a profile of relatively less distribution to greater-angle directions (FIG. 2).

In the case where light diffusing microparticles satisfying Δn×d=0.29 μm were used, like in the case of Δn×d=0.16, the wavelength dependency of the diffusion took place according to the wavelength dependency of Δn. These light diffusing microparticles were equivalent to those that conventionally have been used in the light diffusing sheet so as to prevent a light source behind from being seen, that is, to prevent so-called see-through.

The foregoing tendency was suppressed when Δn×d was increased, and in the case where light diffusing microparticles satisfying Δn×d=0.80 were used, to the contrary, the color temperature lowered when the observation angle increased in the vicinity of the normal direction (FIG. 1). Thus, the curve shown in FIG. 1 changed from an approximate U shape to an approximate W shape when Δn×d was increased. Furthermore, the diffusion pattern became such that the diffusion in the vicinity of the normal direction and its vicinity relatively decreases, thereby having a profile of relatively great distribution to greater-angle directions (FIG. 2).

As a result of further detailed examination, it is preferable to set Δn×d of the light diffusing microparticles in the vicinity of 0.2 μm to obtain a diffusion pattern excelling in the diffusion in the vicinity of the normal direction, and it was confirmed that the diffusion pattern exhibits substantially no change when Δn×d is in a range of 0.1 μm to 0.3 μm. When Δn×d exceeded the foregoing range, the diffusion pattern had a relatively steep peak in the vicinity of the normal direction and lower slopes. Besides, the wavelength dependency occurred in the diffusion pattern and the tendency of having a steep peak in the normal direction and lower slopes becomes more remarkable as the wavelength was shorter. This tendency is considered to affect so as to reduce the wavelength dependency of the diffusion characteristic due to the wavelength dependency of the refractive index difference Δn.

Figure 3:
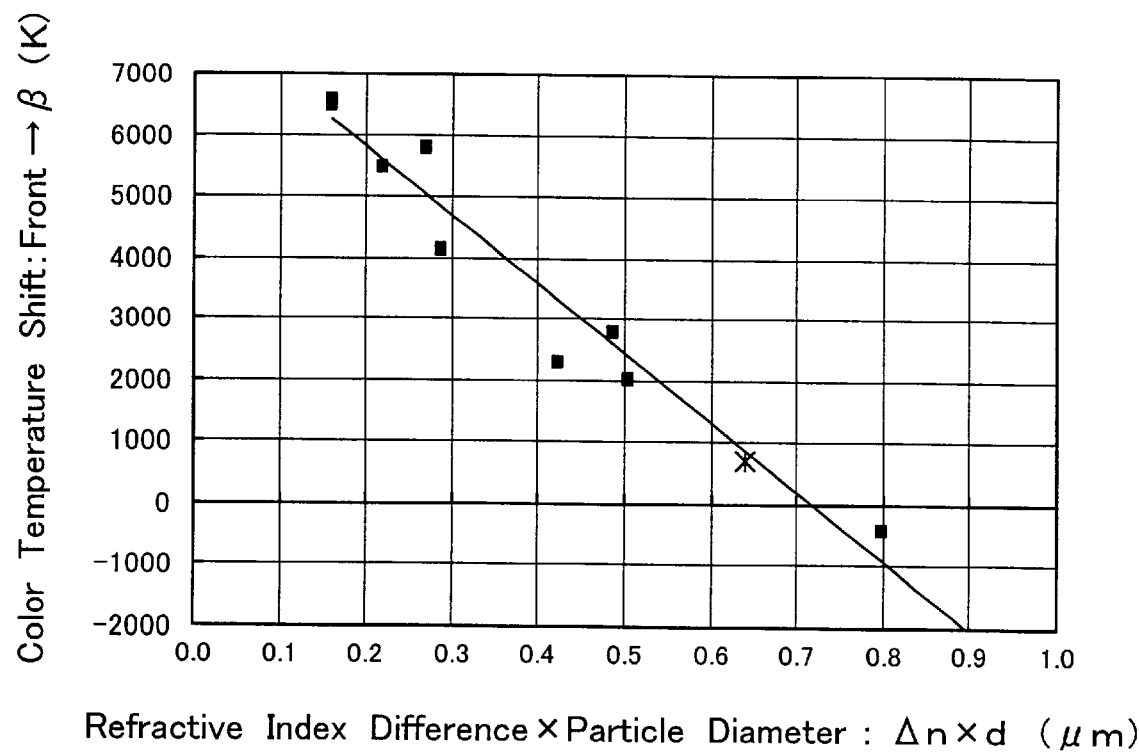
FIG. 3 is a graph showing the relationship between a product of a refractive index difference and a particle diameter as to a light diffusing sheet and color temperature shift.

Color temperature shifts of the aforementioned nine diffusing sheet samples are plotted as change quantities from color temperatures detected in the normal direction to color temperatures measured at β angles, respectively, in a graph of FIG. 3. In FIG. 3, the horizontal axis indicates a product of a difference Δd between refractive indices of the light diffusing microparticles and the base used therein and an average particle diameter d, that is, Δn×d, and the vertical axis indicates a color temperature shift at the βangle (a change quantity from the color temperature in the normal direction). Each measured value is plotted with a solid square "♦" and an approximate straight line is applied. The color temperature shift (from the normal direction to the β angle (Front→β) is minimized in the vicinity of Δn×d=0.7 μm. Among the nine samples, the sample using the light diffusing microparticles that had a refractive index of 1.55 (Δn=0.06) and an average particle diameter of 13.3 μm (Δn×d=0.80 μm) exhibited the smallest color temperature shift, which was −410 K. This sample was one of the samples whose characteristics are shown in FIGS. 1 and 2.

It should be noted that since the average particle diameter, 13.3 μm, of the light diffusing microparticles was relatively great, a great amount of the light diffusing microparticles had to be dispersed so that the prescribed angle of visibility was obtained, and it also caused the light diffusing sheet to have a rougher surface, thereby causing the diffusing sheet to tend to have a defect upon lamination.

Therefore, based on the thus obtained knowledge, light diffusing microparticles made of styrene with an average particle diameter of 6.4 μm and a refractive index of 1.59 (Δn×d=0.64 μm) were produced as a sample, in order to satisfy the optimal condition of Δn×d≈0.7 and to realize effective diffusion with the smallest possible mix proportion of the light diffusing microparticles to improve the surface condition, and a screen was produced using the sample and was evaluated. As a result, a good outcome was obtained, with a color temperature shift of 600 K. Measured values are shown with * in FIG. 3.

This confirms that the screen utilizing a newly prepared sample of light diffusing microparticles also exhibited the characteristics indicated by the correlation line that was obtained from the nine samples of light diffusing microparticles, and show that the color temperature shift can be controlled by adjusting Δn×d. It also can be seen that the diffusion characteristic substantially equivalent to that in the case where light diffusing microparticles with a relatively great diameter are used can be realized with a smaller mix proportion of the light diffusing microparticles.

It should be noted that the color temperature shift of not more than 2000 K is a practically acceptable range. According to FIG. 3, a practically acceptable color temperature characteristic can be obtained in the range of the practical angle of visibility β by setting Δn×d in a range of 0.5 μm to 0.9 μm. To obtain a further excellent color temperature characteristic, Δn×d preferably is set in a range of 0.6 μm to 0.8 μm.

The above description is based on an outcome of experiments of a configuration in which the base and the light diffusing microparticles are made of at least one selected from MMA, styrene, and a copolymer of the same, but as long as they are made of a transparent resin material, the same tendency that the wavelength dispersion of the refractive index tends to increase as the material has a greater refractive index can be seen. For instance, in the case where light diffusing microparticles made of a polycarbonate-based material are used, a similar outcome is obtained.

Furthermore, the foregoing description takes, as an example, a case where light diffusing microparticles were dispersed in the light diffusing sheet 33 of the screen 3 shown in FIG. 9 so as to simplify the preparation of the samples and the evaluation of the same. However, in the case where light diffusing microparticles are dispersed inside the lenticular lens sheet 32 in a screen configuration as shown in FIG. 6, this configuration is identical to the configuration described above in the aspect that the diffusion in the vertical direction relies on the light diffusing microparticles dispersed therein, and the configuration also exhibits the same characteristics as those shown in FIGS. 1 to 3.

On the basis of the foregoing outcomes, the following description will depict a preferred embodiment of the aspect I of the present invention as to a rear-projection screen that achieves excellent characteristics, and a rear-projection display in which this screen is used.

Embodiment I-1

Figure 6:
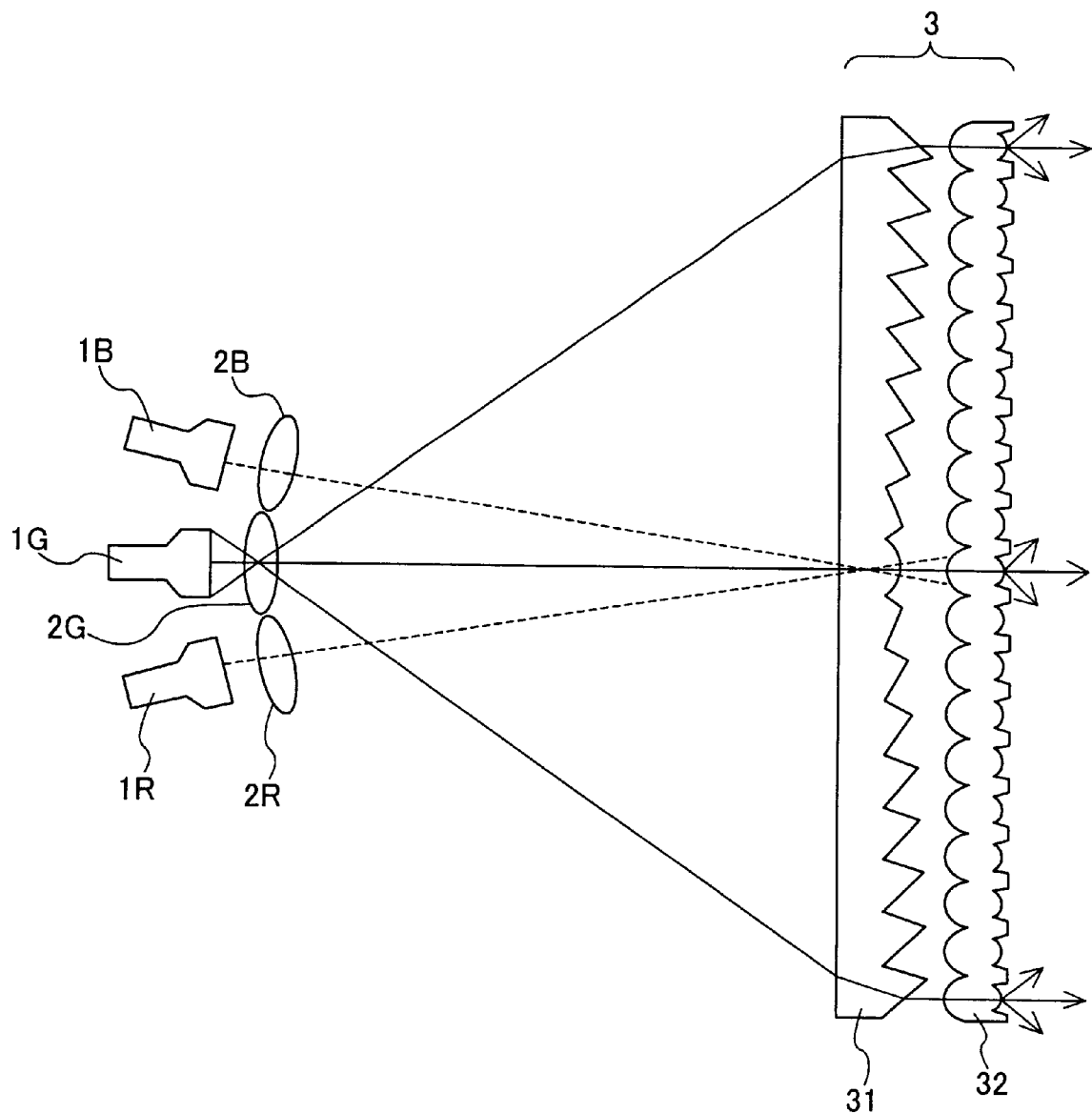
FIG. 6 is a view illustrating a state of a rear-projection screen according to one embodiment of the aspect I of the present invention when used in a three-tube-type rear-projection display.

A rear-projection screen of the present embodiment, for instance, has a configuration as shown in FIG. 6, and includes at least a lenticular lens sheet 32 and a Fresnel lens sheet 31. The lenticular lens sheet 32 contains, in a base thereof made of a resin material, light diffusing microparticles made of a resin material having a refractive index different from that of the base. The light diffusing microparticles satisfy Formula I-1 below:

$$0.5 \, \mu m \leq \Delta N1 \times d1 \leq 0.9 \, \mu m \qquad \text{Formula I-1}$$

where ΔN1 represents a difference between a refractive index of the light diffusing microparticles and a refractive index of the base material of the lenticular lens sheet, and d1 represents an average particle diameter of the light diffusing microparticles.

Figure 10:
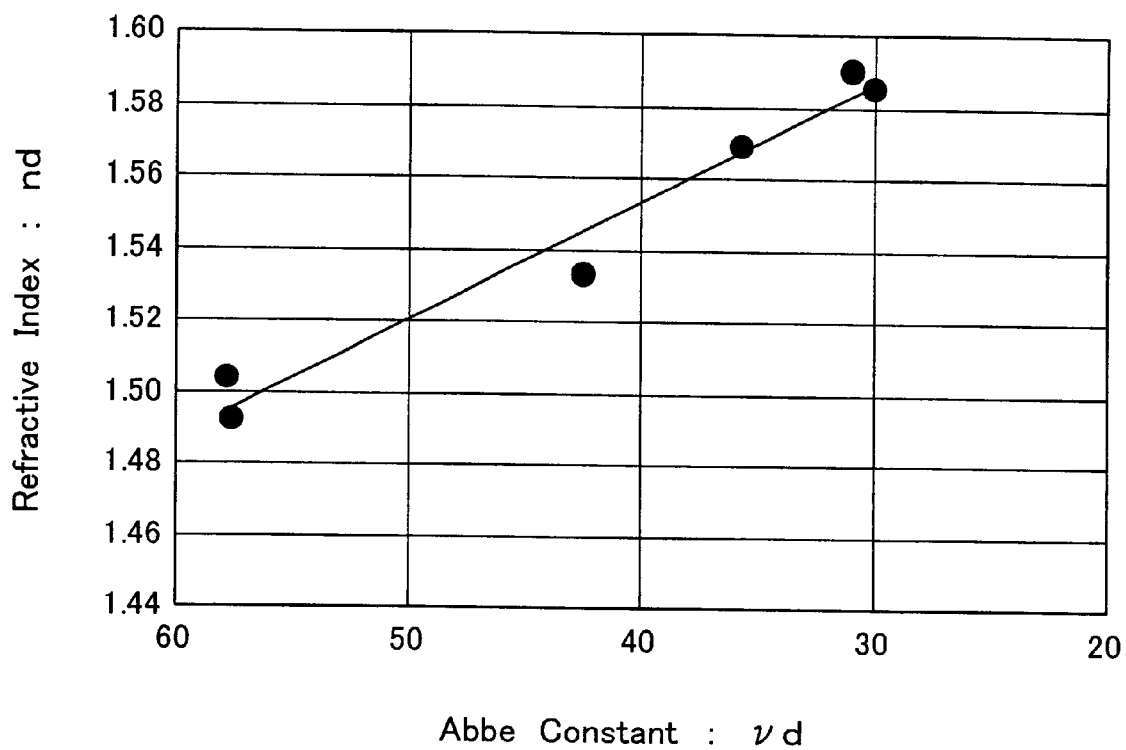
FIG. 10 is a graph showing the relationship between a refractive index of a typical optical resin material and the Abbe constant.

As materials for the base and the light diffusing microparticles, a combination of generally-used resin materials can be used that has a characteristic in that the Abbe constant νd decreases (dispersion increases) as the refractive index increases as shown in FIG. 10.

In other words, it is possible to select and use resin materials for the light diffusing microparticles and the lenticular lens sheet 32 so as to satisfy Formula I-3 below:

$$(n1-n2) \times (\nu 1-\nu 2) < 0 \qquad \text{Formula I-3}$$

where n1 and ν1 represent a refractive index and an Abbe constant, respectively, of the material forming the light diffusing microparticles and n2 and ν2 represent a refractive index and an Abbe constant, respectively, of a material forming the lenticular lens sheet 32 in which the light diffusing microparticles are dispersed.

As shown in FIG. 6, the rear-projection screen 3 includes the lenticular lens sheet 32 and the Fresnel lens sheet 31 that are disposed in parallel with each other and whose bases both are made of transparent resin materials.

The lenticular lens sheet 32 can be formed by utilizing a transparent resin such as MMA, styrene, or a copolymer resin of the same, to form its base, and dispersing therein the light diffusing microparticles made of the transparent resin with a refractive index different from that of the base so that the light diffusing microparticles serve as an isotropic diffusing element. Here, no limitation is on a producing method, and a method is applicable in which a light diffusing sheet produced beforehand in a flat plate shape by casting, injection molding, or extrusion is hot-pressed so as to have a lenticular lens form, or a roll extrusion method in which a resin is shaped while extruded using a roll-shaped die in a reversed shape of a desired lenticular lens shape, or the like.

As shown in Formula I-1, by setting a product Δn×d of the refractive index difference Δn between the light diffusing microparticles and the base and the average particle diameter d of the light diffusing microparticles so as to be in a range of 0.5 μm to 0.9 μm, a rear-projection screen that excels in the color temperature characteristic, that is, that undergoes a color variation of not more than 2000 K in the range of the practical angle of visibility β, can be realized using materials having general wavelength dispersion characteristics to form the light diffusing microparticles and the base.

It should be noted that, in the foregoing configuration, since the diffusing effect relatively decreases in the vicinity of the normal direction, belt-like bright regions (bright lines) extending in the horizontal direction, called hot bands, are observed in some cases when the foregoing screen is used for configuring a rear-projection display.

In such a case, it is preferable to add, to the lenticular lens sheet 32, the foregoing light diffusing microparticles satisfying Formula I-1 as a main diffusing element, and light diffusing microparticles that are made of a resin material having a refractive index different from that of the base of the lenticular lens sheet 32 and that satisfy Formula I-5 below, as a sub diffusing element:

$$0.1 \, \mu m \leq \Delta Ns \times ds \leq 0.3 \, \mu m \qquad \text{Formula I-5}$$

where ΔNs represents a difference between a refractive index of the light diffusing microparticles serving as the sub diffusing element and a refractive index of the lenticular lens sheet base containing the same, and ds represents an average particle diameter of the light diffusing microparticles serving as the sub diffusing element.

With this configuration, the diffusion in the vicinity of the normal direction can be improved, thereby making it possible to avoid a defect such that the light source behind is seen through. The addition of the sub light diffusing microparticles diffusing element preferably is limited to a minimum amount necessary for the avoidance of the defect that the light source is seen through the screen. This is because the color temperature characteristic of the diffusion sometimes is impaired when the effect of the sub light diffusing microparticles on the angle of visibility exceeds the effect of the main light diffusing microparticles.

Generally, the diffusing function increases as a concentration A of the dispersed light diffusing microparticles increases, as the layer containing the light diffusing microparticles (diffusing layer) has a greater thickness t, as the light diffusing microparticles have a smaller average particle diameter d, and as the difference $\Delta n$ from the refractive index of the base increases, and further, the diffusion function substantially is proportional to $A \times t/d \times \Delta n$.

Therefore, to prevent the aforementioned defects, it is preferable that an average particle diameter dm and a mix proportion by volume Am of the light diffusing microparticles as the main diffusing element, a thickness tm of a base layer containing the light diffusing microparticles as the main diffusing element, a difference $\Delta Nm$ between a refractive index of the light diffusing microparticles as the main diffusing element and a refractive index of the base containing the foregoing light diffusing microparticles, an average particle diameter ds and a mix proportion by volume As of the light diffusing microparticles as the sub diffusing element, a thickness ts of a base layer containing the light diffusing microparticles as the sub diffusing element, a difference $\Delta Ns$ between a refractive index of the light diffusing microparticles as the sub diffusing element and a refractive index of the base containing the foregoing light diffusing microparticles are set so as to satisfy Formula I-6 below:

$$Am \times tm/dm \times \Delta Nm > As \times ts/ds \times \Delta Ns \qquad \text{Formula I-6}$$

It should be noted that in the case where the lenticular lens sheet 32 is made to contain the main light diffusing microparticles and the sub light diffusing microparticles, the lenticular lens sheet 32 may be configured in a multi-layer form in which the main and sub light diffusing microparticles are dispersed in the same layer, or in a multi-layer form in which the main and sub light diffusing microparticles are dispersed in different layers, respectively. In the former case, the thickness tm and the thickness ts in Formula I-6 coincide with each other.

A configuration in which a lenticular lens array whose lengthwise direction is directed in the horizontal direction is provided on a light-projected side of the Fresnel lens sheet 31 is effective also to suppress the aforementioned hot bands.

Since the lenticular lenses effectively diffuse light in a limited angle range due to a refraction effect at an interface with air, they have an excellent characteristic in the diffusion in the vicinity of the normal direction, and provide a significant effect in suppressing the hot bands. In the case where the diffusion angle is set excessively great, however, this diffusion along with the diffusion by the light diffusing microparticles dispersed in the lenticular lens 32 causes multiple diffusion, thereby impairing the resolving power. Therefore, the diffusion angle range preferably is restrained to a minimum level required for reducing the hot bands.

More specifically, the diffusion angle range by the lenticular lenses provided on the light-projected side of the Fresnel lens sheet 31 preferably is approximately −3° to +3°.

Furthermore, in the case where light diffusing microparticles also are to be dispersed in the Fresnel lens sheet 31 with a view to suppressing the moiré effect, scintillation, etc., the light diffusing microparticles dispersed in the Fresnel lens sheet 31 preferably are made of a resin material having a refractive index different from a refractive index of a base material forming the base of the Fresnel lens sheet 31, and satisfy Formula I-4 below:

$$0.1 \, \mu m \leq \Delta Nf \times df \leq 0.3 \, \mu m \qquad \text{Formula I-4}$$

where $\Delta Nf$ represents a difference between a refractive index of the light diffusing microparticles contained in the Fresnel lens sheet and a refractive index of a base of the Fresnel lens sheet, and df represents an average particle diameter of the light diffusing microparticles contained in the Fresnel lens sheet.

In the foregoing case, the light diffusing microparticles preferably are added to the Fresnel lens sheet 31 so that the diffusion of light by the light diffusing microparticles contained in the Fresnel lens sheet 31 is smaller than the diffusion of light by the light diffusing microparticles contained in the lenticular lens sheet 32.

While light diffusing microparticles are added to the Fresnel lens sheet 31, the light diffusing microparticles as the sub diffusing element may be added to the lenticular lens sheet 32. A total quantity of the light diffusing microparticles preferably is in a range such that the effect on the angle of visibility caused by the light diffusing microparticles is smaller than the effect caused by the light diffusing microparticles that satisfy Formula I-1 and that serve as the main diffusing element.

Embodiment I-2

Figure 8:
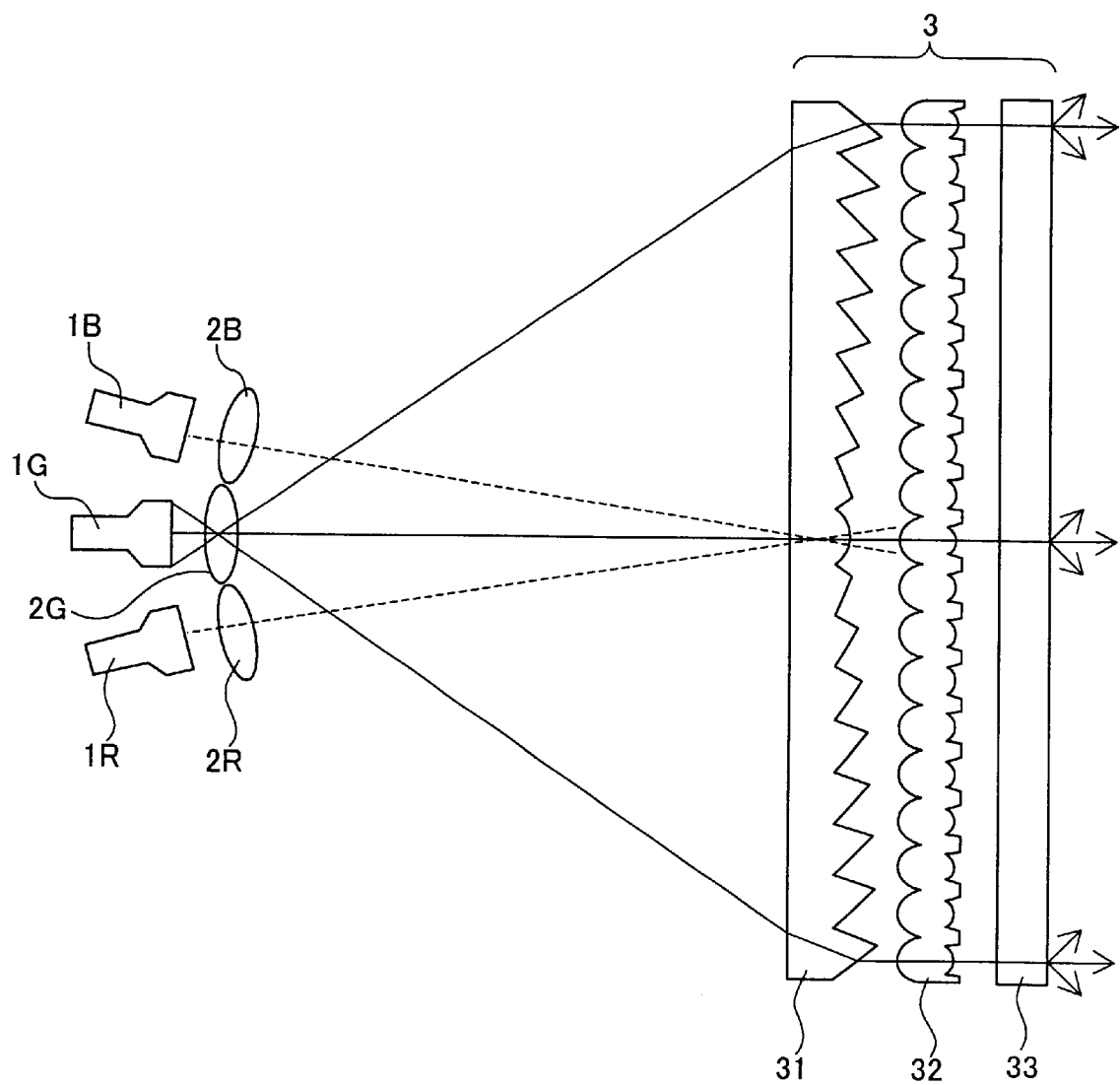
FIG. 8 is a view illustrating a state of a rear-projection screen according to another embodiment of the aspect I of the present invention when used in a three-tube-type rear-projection display.

A rear-projection screen of the present embodiment, for instance, has a configuration as shown in FIG. 8 or 9, and includes at least a light diffusing sheet 33, a lenticular lens sheet 32 (or 34) and a Fresnel lens sheet 31. The light diffusing sheet 33 contains, in a base thereof made of a resin material, light diffusing microparticles made of a resin material having a refractive index different from that of the base. The light diffusing microparticles satisfy Formula I-2 below:

$$0.5 \, \mu m \leq \Delta Np \times dp \leq 0.9 \, \mu m \qquad \text{Formula I-2}$$

where $\Delta Np$ represents a difference between a refractive index of the light diffusing microparticles and a refractive index of the base of the light diffusing sheet, and dp represents an average particle diameter of the light diffusing microparticles.

As materials for the base and the light diffusing microparticles, a combination of generally-used resin materials can be used that has a characteristic in that the Abbe constant vd decreases (dispersion increases) as the refractive index increases as shown in FIG. 10.

In other words, it is possible to select and use resin materials for the light diffusing microparticles and the light diffusing sheet 33 so as to satisfy Formula I-3 below:

$$(n1-n2) \times (v1-v2) < 0 \qquad \text{Formula I-3}$$

where n1 and v1 represent a refractive index and an Abbe constant, respectively, of the material forming the light diffusing microparticles and n2 and v2 represent a refractive index and an Abbe constant, respectively, of a material forming the light diffusing sheet 33 in which the light diffusing microparticles are dispersed.

As shown in FIG. 8 or 9, the rear-projection screen includes the light diffusing sheet 33, the lenticular lens sheet 32 (or 34), and the Fresnel lens sheet 31 that are disposed in parallel with each other and whose bases both are made of transparent resin materials.

The light diffusing sheet 33 can be formed by utilizing a transparent resin such as MMA, styrene, or a copolymer resin of the same, to form its base, and dispersing therein the light diffusing microparticles made of the transparent resin with a refractive index different from that of the base so that the light diffusing microparticles serve as an isotropic diffusing element. Here, there is no limitation on a producing method, and a method is applicable in which a light diffusing sheet produced beforehand in a flat plate shape by casting, injection molding, or extrusion is hot-pressed so as to have a lenticular lens form, or a roll extrusion method in which a resin is shaped while extruded using a roll-shaped die in a reversed shape of a desired lenticular lens shape, or the like.

In the present embodiment also, as shown in Formula I-2, by setting a product $\Delta n \times d$ of the refractive index difference $\Delta n$ between the light diffusing microparticles and the base and the average particle diameter d of the light diffusing microparticles so as to be in a range of 0.5 $\mu$m to 0.9 $\mu$m, a rear-projection screen that excels in the color temperature characteristic, that is, that undergoes a color variation of not more than 2000 K in the range of the practical angle of visibility $\beta$, can be realized using materials having general wavelength dispersion characteristics to form the light diffusing microparticles and the base.

It should be noted that, in the foregoing configuration, since the diffusing effect relatively decreases in the vicinity of the normal direction, belt-like bright regions (bright lines) extending in the horizontal direction, called hot bands, are observed in some cases when the foregoing screen is used for configuring a rear-projection display.

In such a case, like in Embodiment I-1, it is preferable to add, to the light diffusing sheet 33, the foregoing light diffusing microparticles satisfying Formula I-2 as a main diffusing element, and light diffusing microparticles that are made of a resin material having a refractive index different from that of the base of the light diffusing sheet 33 and that satisfy Formula I-5 below, as a sub diffusing element:

$$0.1\ \mu m \leq \Delta Ns \times ds \leq 0.3\ \mu m \qquad \text{Formula I-5}$$

where $\Delta Ns$ represents a difference between a refractive index of the light diffusing microparticles serving as the sub diffusing element and a refractive index of the lenticular lens sheet base containing the same, and ds represents an average particle diameter of the light diffusing microparticles serving as the sub diffusing element.

With this configuration, the diffusion in the vicinity of the normal direction can be improved, thereby making it possible to avoid a defect such that the light source behind is seen through. The addition of the sub light diffusing microparticles diffusing element preferably is limited to a minimum amount necessary for the avoidance of the defect that the light source is seen through the screen. This is because the color temperature characteristic of the diffusion sometimes is impaired when the effect of the sub light diffusing microparticles on the angle of visibility exceeds the effect of the main light diffusing microparticles.

Furthermore, for the same reason as that in Embodiment I-1, it is preferable that an average particle diameter dm and a mix proportion by volume Am of the light diffusing microparticles as the main diffusing element, a thickness tm of a base layer containing the light diffusing microparticles as the main diffusing element, a difference $\Delta Nm$ between a refractive index of the light diffusing microparticles as the main diffusing element and a refractive index of the base containing the foregoing light diffusing microparticles, an average particle diameter ds and a mix proportion by volume As of the light diffusing microparticles as the sub diffusing element, a thickness ts of a base layer containing the light diffusing microparticles as the sub diffusing element, a difference $\Delta Ns$ between a refractive index of the light diffusing microparticles as the sub diffusing element and a refractive index of the base containing the foregoing light diffusing microparticles are set so as to satisfy Formula I-6 below:

$$Am \times tm/dm \times \Delta Nm > As \times ts/ds \times \Delta Ns \qquad \text{Formula I-6}$$

It should be noted that in the case where the light diffusing sheet 33 is made to contain the main light diffusing microparticles and the sub light diffusing microparticles, the light diffusing sheet 33 may be configured in a multi-layer form in which the main and sub light diffusing microparticles are dispersed in the same layer, or in a multi-layer form in which the main and sub light diffusing microparticles are dispersed in different layers, respectively. In the former case, the thickness tm and the thickness ts in Formula I-6 coincide with each other.

Furthermore, like in Embodiment I-1, a configuration in which a lenticular lens array whose lengthwise direction is directed in the horizontal direction is provided on a light-projected side of the Fresnel lens sheet 31 is effective also, to suppress the aforementioned hot bands. Here, like in Embodiment I-1, the diffusion angle range by the lenticular lenses provided on the light-projected side of the Fresnel lens sheet 31 preferably is approximately −3° to +3°.

Furthermore, in the case where light diffusing microparticles also are to be dispersed in the Fresnel lens sheet 31 with a view to suppressing the moiré effect, scintillation, etc., the light diffusing microparticles dispersed in the Fresnel lens sheet 31 preferably are made of a resin material having a refractive index different from a refractive index of a base material forming the base of the Fresnel lens sheet 31, and satisfy Formula I-4 below:

$$0.1\ \mu m \leq \Delta Nf \times df \leq 0.3\ \mu m \qquad \text{Formula I-4}$$

where $\Delta Nf$ represents a difference between a refractive index of the light diffusing microparticles contained in the Fresnel lens sheet and a refractive index of a base of the Fresnel lens sheet, and df represents an average particle diameter of the light diffusing microparticles contained in the Fresnel lens sheet.

In the foregoing case, the light diffusing microparticles preferably are added to the Fresnel lens sheet 31 so that the diffusion of light by the light diffusing microparticles contained in the Fresnel lens sheet 31 is smaller than the diffusion of light by the light diffusing microparticles contained in the light diffusing sheet 33.

While light diffusing microparticles are added to the Fresnel lens sheet 31, the light diffusing microparticles as the sub diffusing element may be added to the light diffusing sheet 33. A total quantity of the light diffusing microparticles preferably is in a range such that the effect on the angle of visibility caused by the light diffusing microparticles is smaller than the effect caused by the light diffusing microparticles that satisfy Formula I-2 and that serve as the main diffusing element.

Embodiment I-3

A rear-projection screen of the present embodiment, for instance, has a configuration as shown in FIG. 6, and includes at least a lenticular lens sheet 32 and a Fresnel lens sheet 31. The lenticular lens sheet 32 and the Fresnel lens sheet 31 contain, in bases thereof made of resin materials, light diffusing microparticles made of resin materials having refractive indices different from those of the bases thereof, respectively. The light diffusion caused by the light diffusing microparticles contained in the Fresnel lens sheet 31 is smaller than the light diffusion caused by the light diffusing microparticles contained in the lenticular lens sheet 32, and the light diffusing microparticles contained in the Fresnel lens sheet 31 satisfy Formula I-4 below:

$$0.1 \, \mu m \leq \Delta Nf \times df \leq 0.3 \, \mu m \qquad \text{Formula I-4}$$

where $\Delta Nf$ represents a difference between a refractive index of the light diffusing microparticles contained in the Fresnel lens sheet and a refractive index of the base of the Fresnel lens sheet, and df represents an average particle diameter of the light diffusing microparticles contained in the Fresnel lens sheet.

Alternatively, a rear-projection screen of the present embodiment, for instance, has a configuration as shown in FIG. 8 or 9. In this case, the rear-projection screen includes at least a light diffusing sheet 33, a lenticular lens sheet 32 (or 34) and a Fresnel lens sheet 31. The light diffusing sheet 33 and the Fresnel lens sheet 31 contain, in bases thereof made of resin materials, light diffusing microparticles made of resin materials having refractive indices different from those of the bases, respectively. The light diffusion caused by the light diffusing microparticles contained in the Fresnel lens sheet 31 is smaller than the light diffusion caused by the light diffusing microparticles contained in the light diffusing sheet 33, and the light diffusing microparticles contained in the Fresnel lens sheet 31 satisfy Formula I-4 below:

$$0.1 \, \mu m \leq \Delta Nf \times df \leq 0.3 \, \mu m \qquad \text{Formula I-4}$$

where $\Delta Nf$ represents a difference between a refractive index of the light diffusing microparticles contained in the Fresnel lens sheet and a refractive index of the base of the Fresnel lens sheet, and df represents an average particle diameter of the light diffusing microparticles contained in the Fresnel lens sheet.

In the present embodiment, by setting $\Delta Nf \times df$ in a range of 0.1 $\mu$m to 0.3 $\mu$m, a diffusion characteristic excelling in the diffusing effect in the vicinity of the normal direction and effective for suppressing the scintillation can be obtained. Furthermore, since diffusion components in directions at relatively greater angles are small, the impairment of the resolving power is minimized, and the proportion of optical loss is small even in combination with the BS-provided lenticular lens sheet.

The Fresnel lens sheet 31 can be formed by utilizing a transparent resin such as MMA, styrene, or a copolymer resin of the same, to form its base, and dispersing therein the light diffusing microparticles made of the transparent resin with a refractive index different from that of the base so that the light diffusing microparticles serve as an isotropic diffusing element. Here, there is no limitation on a producing method, and a method is applicable in which a light diffusing sheet produced beforehand in a flat plate shape by casting, injection molding, or extrusion is hot-pressed so as to have a Fresnel lens form, or a method in which the light diffusing sheet is used as a base on which an ultraviolet-hardening resin is applied so as to have the Fresnel lens shape, or the like.

The Fresnel lens sheet provides an effect of suppressing the hot bands that tend to be remarkable as the color temperature characteristic is improved, particularly when the Fresnel lens sheet is used in combination with the lenticular lens sheet or the light diffusing sheet with an improved color temperature characteristic as in Embodiment I-1 or Embodiment I-2.

Embodiment I-4

Figure 4:
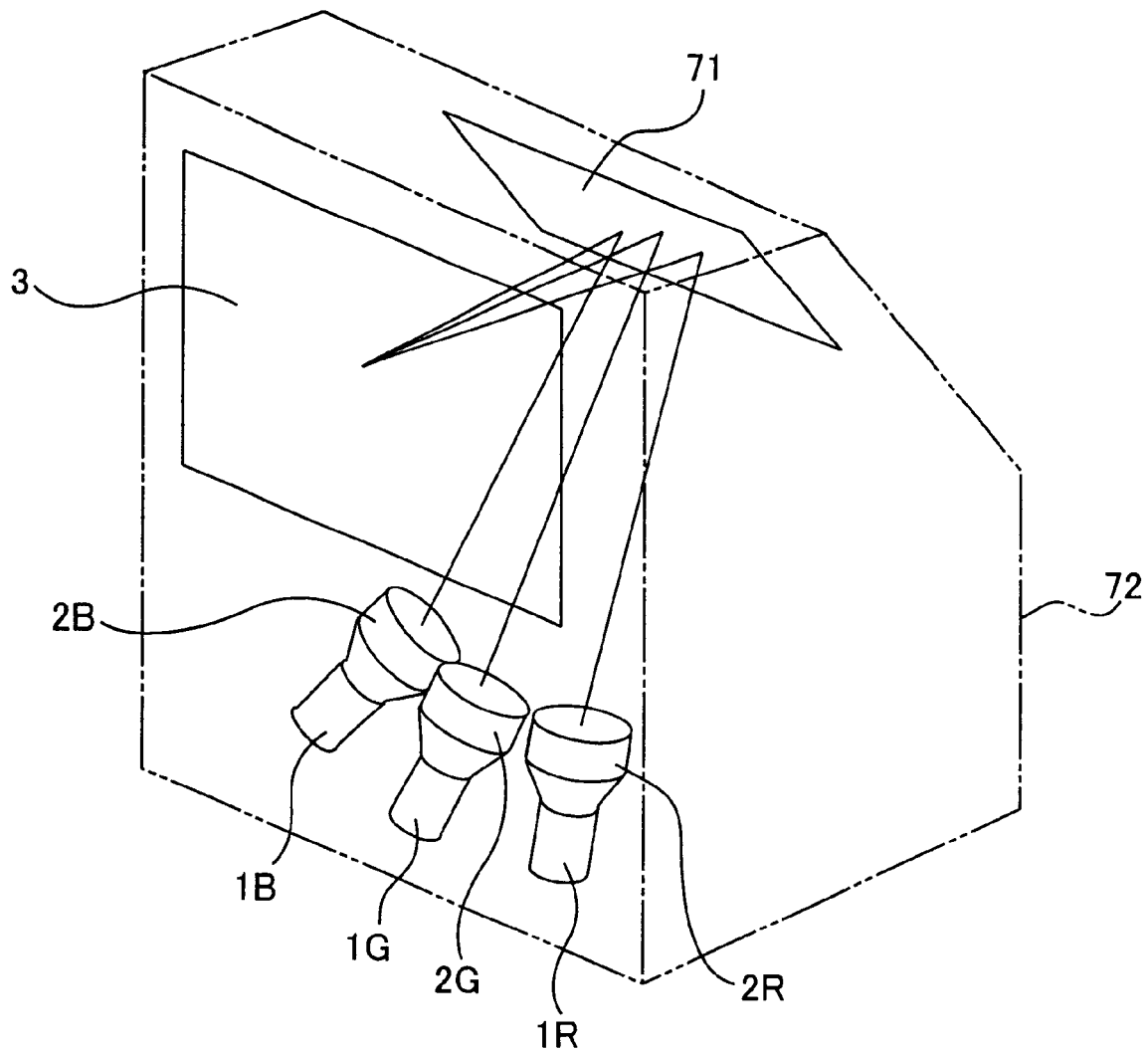
FIG. 4 is a perspective view illustrating a rear-projection display according to one embodiment of the aspect I of the present invention.

A rear-projection display of the present embodiment has a configuration shown in FIG. 4, and includes a rear-projection screen described above. It should be noted that FIG. 4 is a perspective view to show how principal elements are arranged.

In this display, three principal-color images formed on CRTs 1 (1R, 1G, and 1B) are enlarged and projected by projection lenses 2 (2R, 2G, and 2B), respectively. The three principal-color images reflected by a mirror 71 are superimposed on a screen 3, thereby forming a color image, and are diffused due to the effect of the screen 3 so as to be observable as an image at various angles. These members are arranged inside a cabinet 72 that prevents external light from entering the device.

The screen 3 is configured as shown in FIG. 6 or 8. In the case where the screen 3 has a configuration shown in FIG. 6, light diffusing microparticles whose $\Delta n \times d$ is set so as to be in a range of 0.5 $\mu$m to 0.9 $\mu$m as described above are contained in a light diffusing sheet 32. In the case where the screen 3 has a configuration shown in FIG. 8, light diffusing microparticles whose $\Delta n \times d$ is set so as to be in a range of 0.5 $\mu$m to 0.9 $\mu$m as described above are contained in a light diffusing sheet 33. This configuration allows the wavelength dependency of the diffusion caused by the light diffusing microparticles to be suppressed to a minimum level, and a rear-projection display excelling in the color temperature characteristic, that is, that undergoes a color variation of not more than 2000 K in the range of the practical angle of visibility $\beta$, can be realized.

Embodiment I-5

A rear-projection display of the present embodiment has a configuration shown in FIG. 5, and includes a rear-projection screen described above. It should be noted that FIG. 5 also is a perspective view so as to show how principal elements are arranged.

In this display, a projection optics unit 9 is provided. In the projection optics unit 9, a lamp as a light source, an illuminating optical system, a color separation optical system, a liquid crystal panel, a color synthesizing optical system, and the like are provided appropriately, and images are formed by spatial modulation of projected light by a liquid crystal panel. These images are enlarged and projected by a projection lens 6. The projected light reflected by a mirror 71 is brought into focus on a screen 3, and is diffused due to the effect of the screen 3, so as to be observable as an image at various angles. These members are arranged inside a cabinet 72 that prevents external light from entering the device.

The screen 3 is configured as shown in FIG. 6, 8, or 9; however, to make the best use of the characteristic in that the color shift correction is unnecessary, the screen 3 preferably has a configuration shown in FIG. 9. A Fresnel lens sheet 31, as described above, contains light diffusing microparticles whose $\Delta n \times d$ is set so as to be in a range of 0.1 $\mu$m to 0.3 $\mu$m. This allows a diffusion characteristic excelling in the diffusing effect in the vicinity of the normal direction and effective for suppressing scintillation to be obtained. Furthermore, since diffusion components in directions at relatively greater angles are small, the impairment of the resolving power is minimized, and the proportion of optical loss is small even in combination with the BS-provided lenticular lens sheet 34.

Furthermore, by dispersing light diffusing microparticles whose Δn×d is set so as to be in a range of 0.5 μm to 0.9 μm in the light diffusing sheet 33 in the case where the screen 3 has a configuration shown in FIG. 9 or 8, or by dispersing the light diffusing microparticles in the lenticular lens sheet 32 in the case where the screen has a configuration shown in FIG. 6, a rear-projection display with a minimum of color variation with respect to an observation angle is obtained.

Aspect II of the Present Invention

The inventors discovered that significant scintillation was caused because a diffusing layer of a laminated lenticular lens sheet used in a conventional rear-projection display was disposed substantially in the vicinity of a focal plane of a lenticular lens array.

Figure 17:
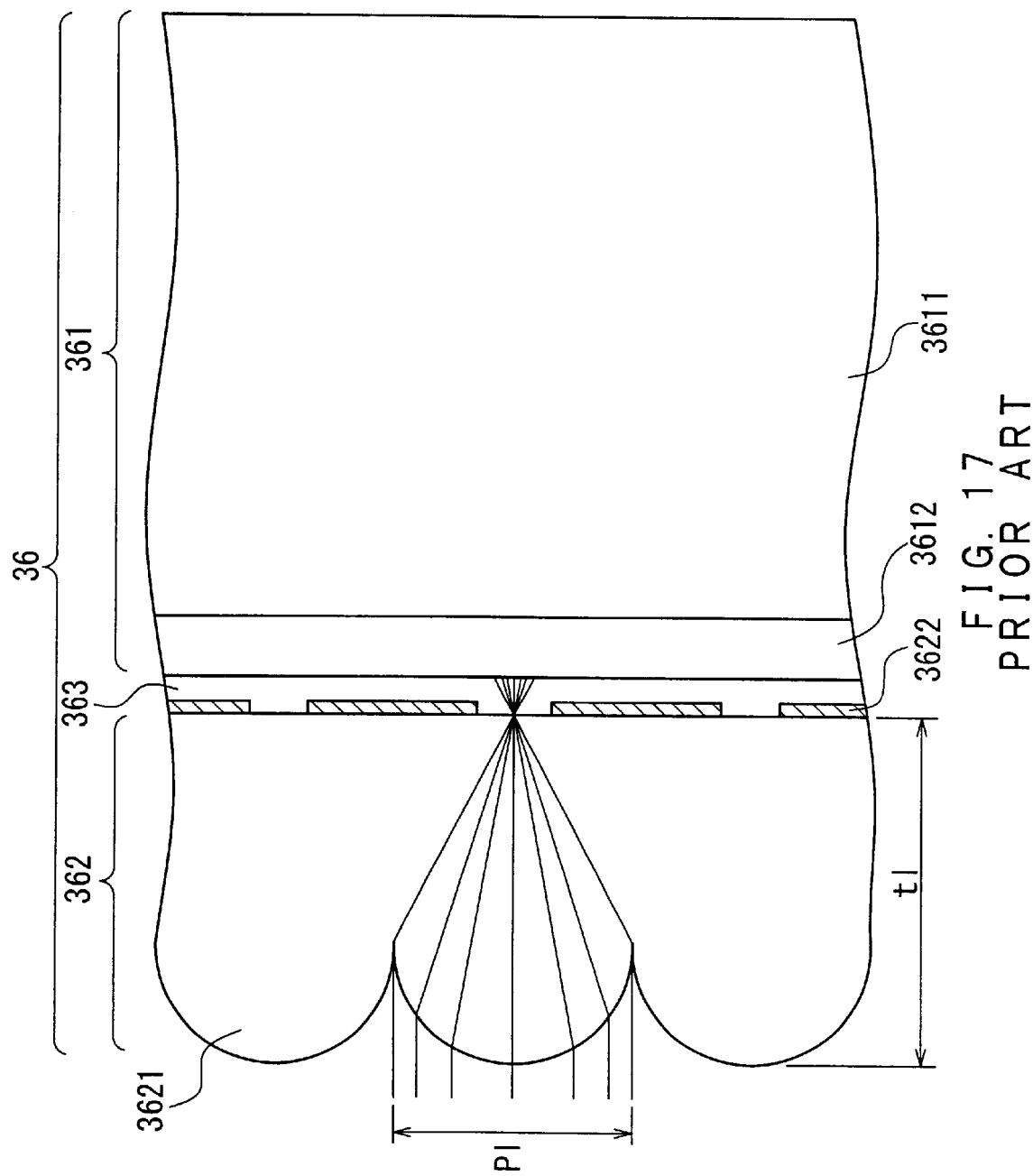
FIG. 17 is a cross-sectional view in the horizontal direction illustrating a principal part of a laminated lenticular lens sheet composing a conventional rear-projection screen.

FIG. 17 is a partially enlarged view of a laminated lenticular lens sheet used in a conventional rear-projection display, and shows ray trajectories as well.

Figure 7:
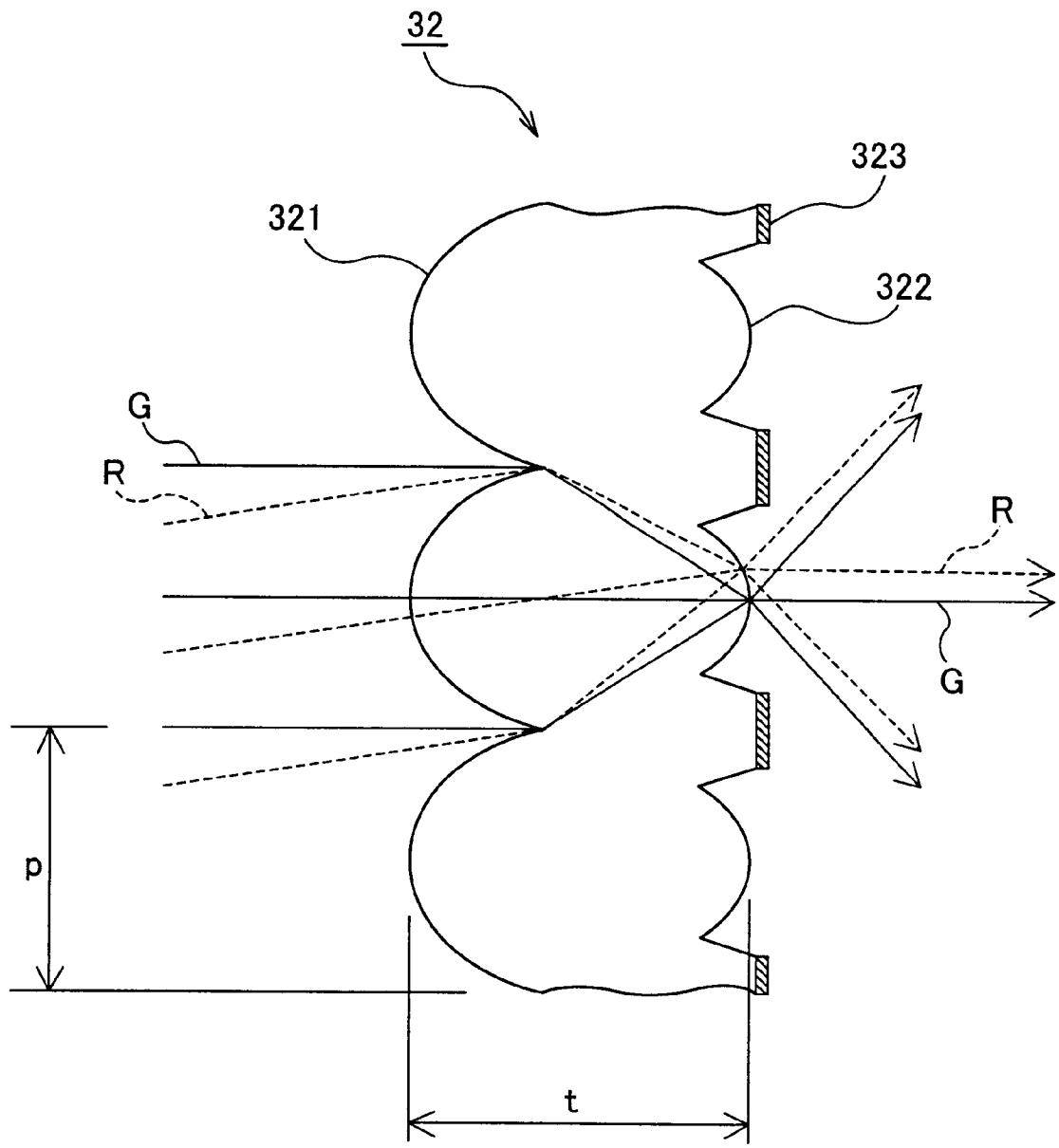
FIG. 7 is a partly enlarged cross-sectional view of a BS paired-lenticular-lens sheet.

As shown in FIG. 7, a conventional laminated lenticular lens sheet 36 is formed by laminating a lenticular lens film 362 and a light diffusing sheet 361 with a transparent adhesive layer 363. The adhesive layer 363 usually has a thickness of approximately 20 μm to 50 μm.

As is seen in FIG. 17, projected light is converged on a focal plane, in the vicinity of a focus of each lenticular lens 3621. Since black stripes 3622 are provided on light non-transmission regions in the vicinity of the focal plane, the black stripes 3622 effectively absorb external light without blocking the projected light, thereby preventing the contrast from deteriorating due to external light.

The diffusing layer 3612 is provided extremely close to the focal plane, separated from the focal plane by the thickness of the transparent adhesive layer 363. Consequently, the projected light is brought into focus in limited regions in the diffusing layer 3612, and light diffusing microparticles in the focus regions are irradiated with light with an extremely high intensity, while light diffusing microparticles in the other regions do not contribute to the diffusion.

The inventors have discovered that the light diffusing microparticles thus irradiated with intense light at limited regions cause significant scintillation. The following description will depict an embodiment of the aspect II of the present invention.

Embodiment II-1

Figure 11:
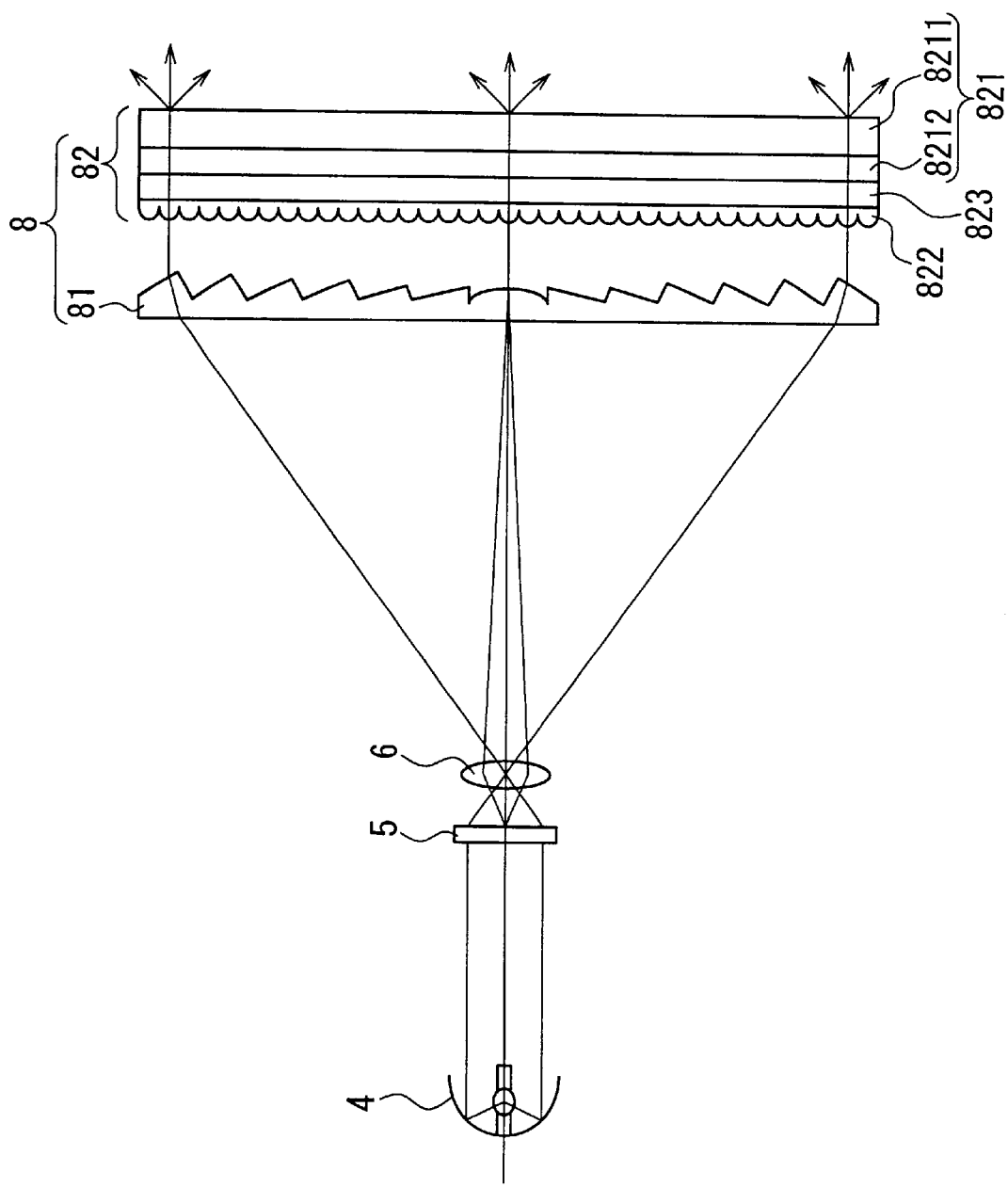
FIG. 11 is a view schematically illustrating a cross section in the horizontal direction of a rear-projection display according to one embodiment of the aspect II of the present invention.
Figure 16:
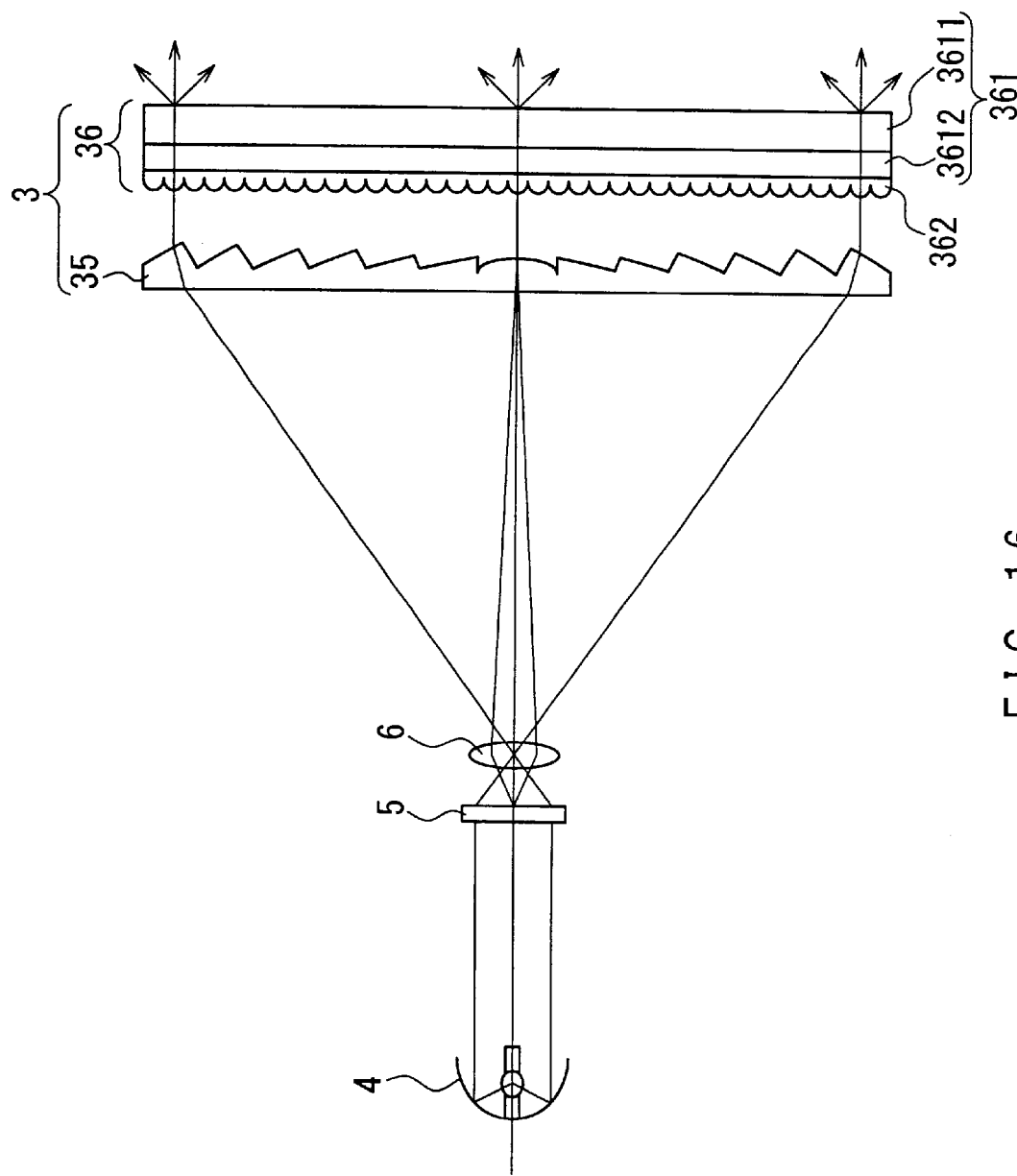
FIG. 16 is a cross-sectional view in the horizontal direction schematically illustrating a configuration of a conventional rear-projection display.

FIG. 11 shows a cross section in the horizontal direction of a rear-projection display according to an embodiment of the aspect II of the present invention. In FIG. 11, members having the same structures and functions as those shown in FIG. 16 illustrating a conventional rear-projection display will be designated by the same reference numerals, and descriptions of the same will be omitted. It should be noted that, though not shown, the display may include a mirror reflecting projected light enlarged and projected by the projection lens 6, and a cabinet housing an optical system and preventing external light from entering, as shown in FIG. 5.

Characteristics of the aspect II of the present invention shown in FIG. 11 are that a transparent Fresnel lens sheet 81 is used, as compared with the conventional rear-projection display provided with a Fresnel lens sheet in which a diffusing material is dispersed for suppressing scintillation, and that a transparent layer 823 is provided between a focal plane of a lenticular lens array of a laminated lenticular lens sheet 82 and a diffusing layer 8212.

Figure 12:
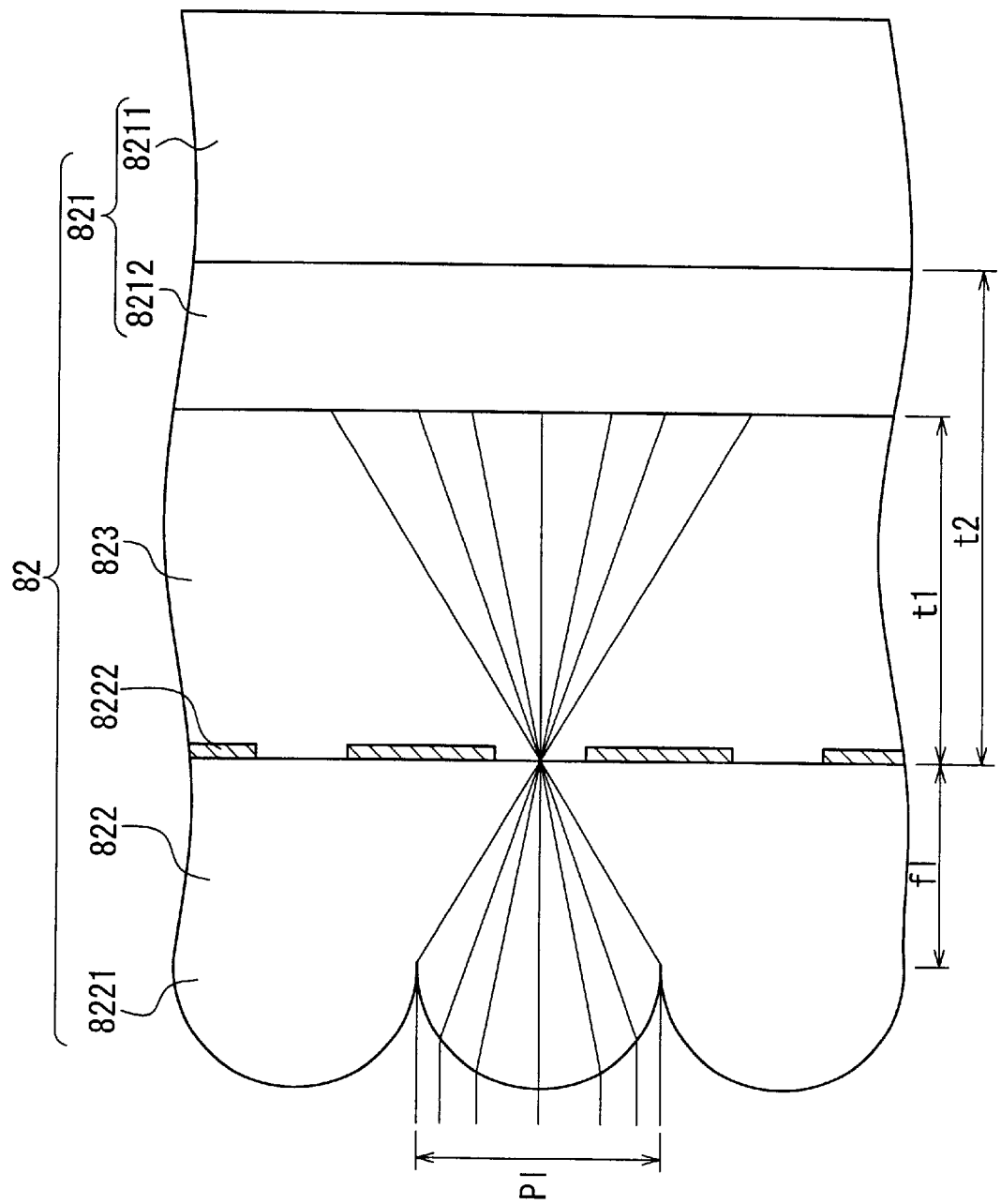
FIG. 12 is a view illustrating a cross section in the horizontal direction of a principal part of a laminated lenticular lens sheet composing a rear-projection screen according to the aspect II of the present invention.

FIG. 12 is a horizontal-direction partially-enlarged view illustrating the lenticular lens sheet 82 part of a rear-projection display according to the aspect II of the present invention, and shows ray trajectories as well.

As shown in FIG. 12, the lenticular lens film 822 includes lenticular lenses 8221 that are provided on the light-incident side and whose lengthwise direction is directed in the vertical direction. The lenticular lens film 822 has a thickness set so that the focus position of each lenticular lens 8221 substantially coincides with the light-exiting surface of the film. Therefore, light non-transmission regions that the projected light does not pass through and whose lengthwise direction is directed in the vertical direction are provided in a stripe form. On the light non-transmission regions, light absorbing layers (black stripes) 8222 are provided in a stripe form.

821 denotes a diffusing sheet, which is obtained by laminating a diffusing layer 8212 and a transparent layer 8211. The light absorbing layers 8222-side surface of the lenticular lens film 822 and the diffusing layer 8212-provided surface of the diffusing sheet 821 are made to adhere to each other with the transparent layer 823 interposed therebetween.

In FIG. 12, f1 represents a distance from valleys of the lenticular lens array to the focal plane of the lenticular lens array, t1 represents a distance from the focal plane of the lenticular lens array to a light-projected side (spatial modulation element-side) surface of the diffusing layer 8212, and t2 represents a distance from the focal plane of the lenticular lens array to an image-observed-side surface of the diffusing layer 8212. The aspect II of the present invention is intended to allow the generation of scintillation to be minimized by setting t1 appropriately, and to allow a high resolving power to be maintained by setting t2 appropriately.

The following description will depict requirements for suppressing scintillation.

The thickness of the transparent layer 823 is not less than the distance f1 between the valleys of the lenticular lens array and the focal plane of the lenticular lens array, and therefore causes the distance t1 between the light-projected-side surface of the diffusing layer 8212 and the focal plane of the lenticular lens array to be not less than f1.

$$t1 \leq f1$$

In a configuration as shown in FIG. 12, light converged in the vicinity of the focal plane by the function of the lenticular lens array is incident on the diffusing layer 8212, having a width not less than a pitch P1 of the lenticular lenses 8221. Consequently, an average luminance in an effective region that is formed by light incident on one lenticular lens unit and reaching the diffusing layer 8212 can be made not more than a luminance of the projected light upon incidence on the lenticular lens. It should be noted that in the vicinity of each light-incident region through which light from each lenticular lens 8221 is incident on the diffusing layer 8212, projected light from adjacent lenticular lenses is also incident, but such light has a greatly different incident angle and interferes with each other, thereby generating no scintillation.

Thus, the foregoing configuration prevents local irradiation of light diffusing microparticles with light of high intensity, thereby significantly suppressing scintillation. Consequently, it is possible to obtain a sufficient display quality even in the case where a transparent Fresnel lens sheet 81 is utilized in which no diffusing material is dispersed.

Scintillation is reduced as the distance between the diffusing layer 8212 and the focal plane of the lenticular lens array increases. According to the research by the inventors of the present invention, to achieve a remarkable effect as compared with the case where the diffusing layer 8212 is provided on the focal plane, the distance between the diffusing layer 8212 and the lenticular lens array focal plane is required to be not less than f1 described above, and preferably is about three times f1 described above.

The setting as described above enables significant reduction of scintillation, but the resolving power decreases if the distance between the diffusing layer 8212 and the lenticular lens array focal plane is set to be excessively great.

The following description will depict conditions for maintaining a resolving power as a second part of the aspect II of the present invention.

Figure 13:
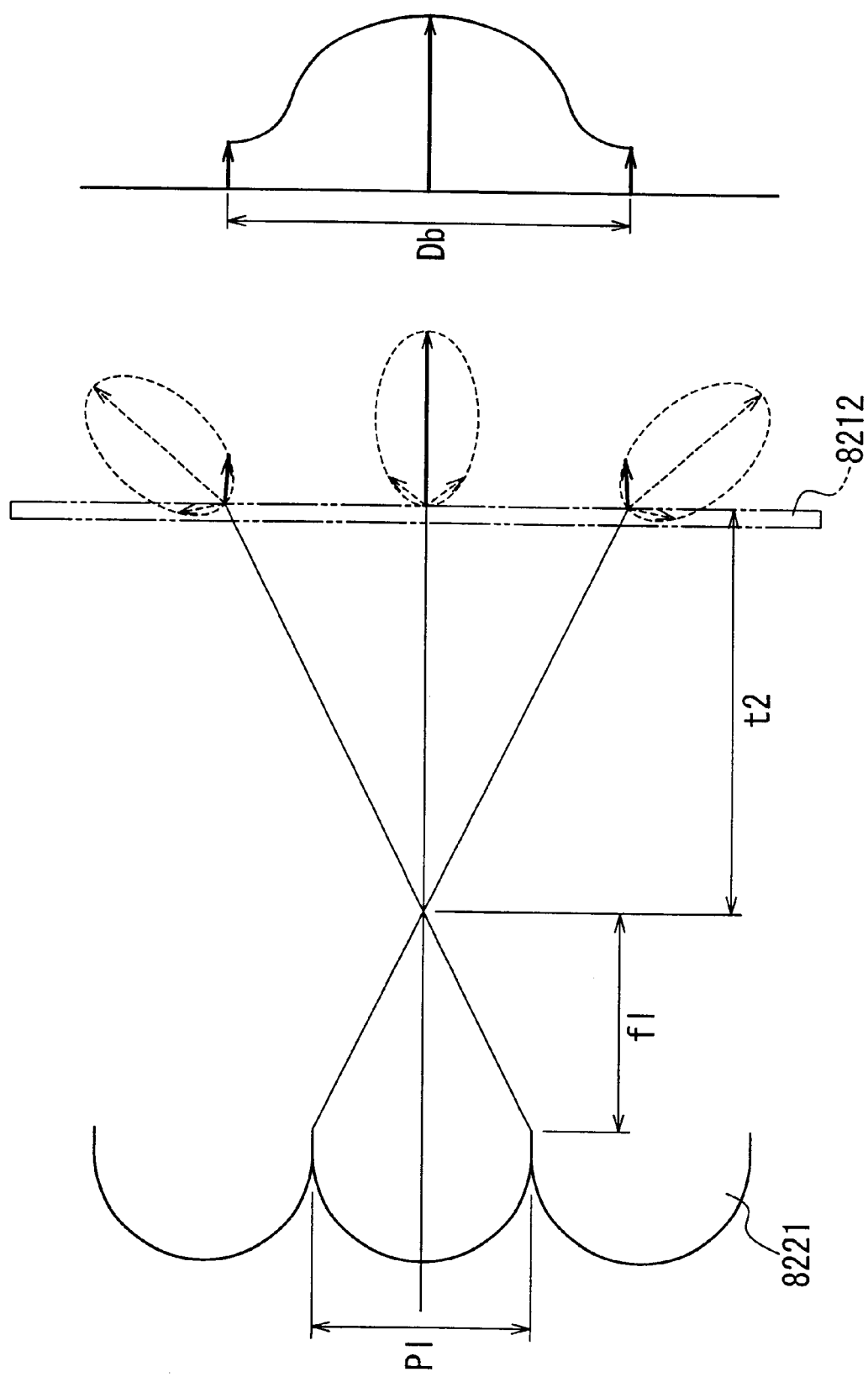
FIG. 13 is a cross sectional view in the horizontal direction for explaining the range of a beam spot in the case of a rear-projection display according to one embodiment of the aspect II of the present invention.

The following description will depicts a mechanism of the decrease in the resolving power in the case where the distance between the diffusing layer 8212 and the lenticular lens array focal plane is increased, while referring to FIG. 13. To develop a clear discussion, a model in which diffusion regions are concentrated at the image-observed-side surface (positions at the distance t2 from the focal plane of the lenticular lens array) is discussed. Since the resolving power seems to decrease as the diffusing layer 8212 is provided at a position farther from the focal plane of the lenticular lens array, a resolving power greater than that in the present model seems to be achieved in the case of the aspect II of the present invention, in which the diffusing layer 8212 is provided on a position further on the light-projected side than the position described above.

Light incident on lenticular lens units provided at an array pitch P1 in the lenticular lens array passes through a focus of each lenticular lens unit, reaches the diffusing layer 8212 along trajectories as shown in FIG. 13, and is diffused according to diffusion characteristics of the diffusing layer 8212, which are shown with ellipses in the figure. When viewed in the normal direction, the light is observed as a beam flaring with an intensity distribution according to normal direction components of the foregoing ellipses as shown on the right side of FIG. 13.

As is clear from FIG. 13, the beam has a width Db expressed as:

$$Db = t2 \times p1/f1$$

As to a rear-projection display of the aspect II of the present invention, even on the assumption that the diffusing effect concentrates on an image-observed-side surface of the diffusing layer 8212, the distance t2 between the image-observed-side surface of the diffusing layer 8212 and the lenticular lens array focal plane is set as shown below so that the beam width Db should be not more than a pixel pitch Pg:

$$Db = t2 \times P1/f1 \leq Pg$$

$$t2 \leq Pg/P1 \times f1$$

By thus setting the same, it is possible to realize a rear-projection display that has an excellent resolving power, undergoing a minimum of the resolving power decrease due to the screen even with respect to a maximum spatial frequency 1/(2×Pg) that the device is capable of presenting.

It should be noted that transparency of the Fresnel lens sheet 81 and the transparent layer 823 in the foregoing description signifies that a light diffusing material intended for diffusing light substantially is not contained, and it does not mean completely no diffusing effect. For instance, what normally is called as a transparent plate still has slight diffusivity due to structural unevenness, for instance, presence of a minute amount of impurities, etc. To quantify a relatively small diffusivity, an index called haze value is often used. A haze value of not more than 1% indicates high-level transparency, while a haze value of not more than 10% is regarded as a level of substantially no diffusion effect, thereby being expressed as transparent. The foregoing definition as to the "transparency" applies to all the aspects I and II of the present invention.

Furthermore, the transparent layer 8211 provided on the image-observed side of the diffusing layer 8212 is provided so as to increase the mechanical strength, and makes no optical contribution. Therefore, as long as the laminated lenticular lens sheet 82 can be maintained, it may be omitted.

Embodiment II-2

In the case where the vertical angle of visibility is limited by decreasing the angle of diffusion by the diffusing layer 8212 so as to give precedence to a normal-direction luminance, requirements for preventing the resolving power from decreasing can be defined with another index shown in Embodiment II-1 above.

In this case as well, the rear-projection display has the same configuration as shown in FIG. 11, and like in Embodiment II-1, to suppress scintillation, the distance t1 between the light-projected-side surface of the diffusing layer 8212 and the focal plane of the lenticular lens array is set as described below:

$$t1 \geq f1$$

Assuming that a diffusion characteristic of the diffusing layer 8212 can be given as below, as to an observation luminance I in the case where parallel light rays are incident perpendicularly, the observation luminance I can be given as a function of an observation angle θ:

$$I = I0 \times f(\theta)$$

$$I/I0 = f(\theta)$$

where I0 represents a luminance in the normal direction of the diffusing layer, and necessarily f(0)=1.

Figure 14:
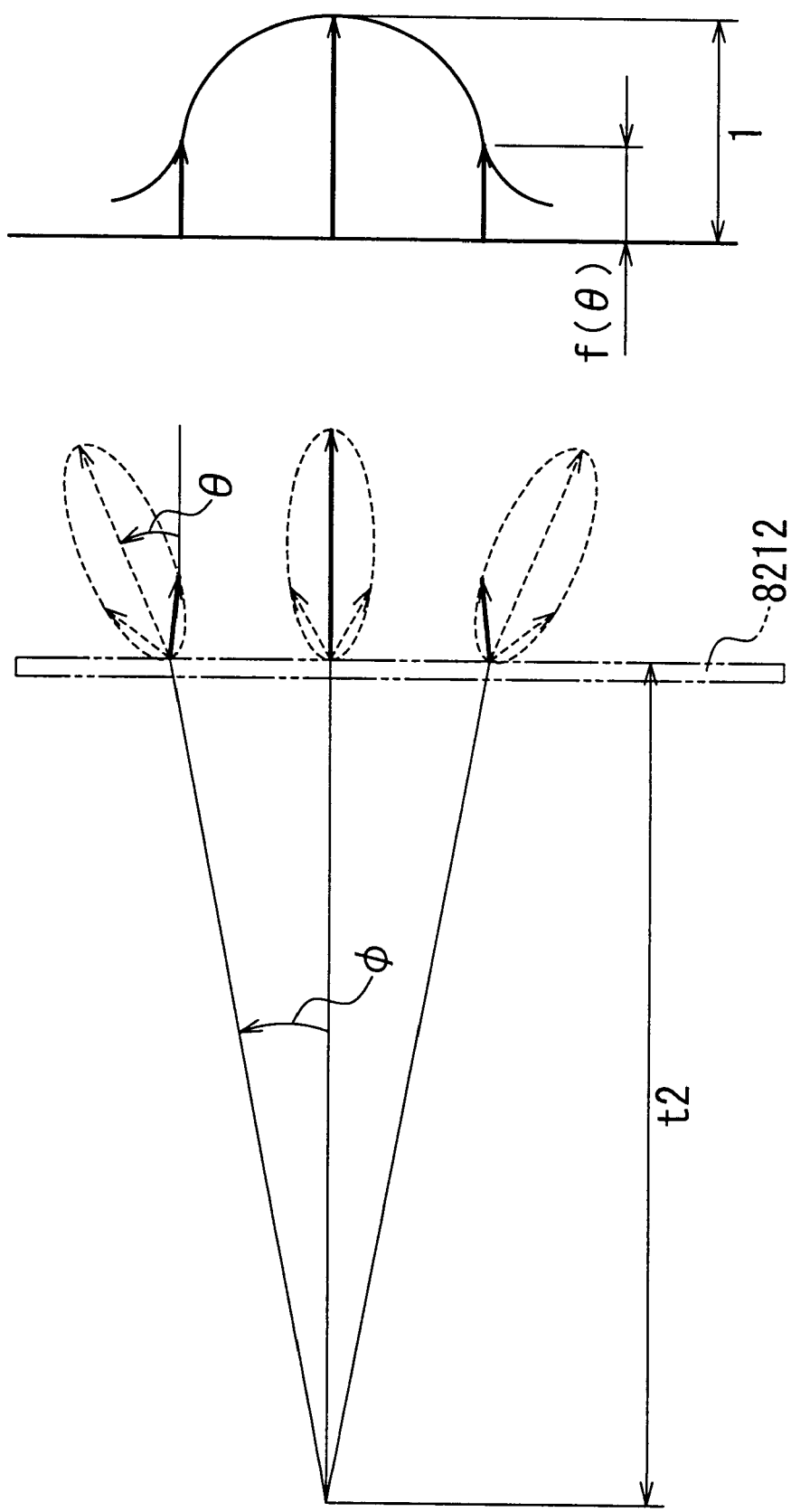
FIG. 14 is a cross sectional view in the horizontal direction for explaining the range of a beam spot in the case of a rear-projection display according to one embodiment of the aspect II of the present invention.

FIG. 14 is a view schematically illustrating a state in which a pulse-like incident light is observed as a beam spot with a finite range in the case where the diffusing layer 8212 with such a diffusion characteristic is present at the distance t2 from the lenticular lens array focal plane.

In FIG. 14, in order to discuss only the resolution power decrease due to the multiple diffusion, a pulse-like input is assumed, and further, the pitch of the lenticular lenses is assumed to be infinite, and light is assumed to be emitted as completely diffused light from one point on the focal plane of the same in the horizontal direction. Moreover, the thickness of the diffusing layer 8212 is assumed to be infinite, and the image-observed side of the diffusing layer 8212 is assumed to be an interface with air. It should be noted that the mechanism of expansion of the range of a beam spot in the case where the transparent layer 8211 is provided on the image-observed side of the diffusing layer 8212 is identical to the mechanism described above.

Light emitted in the optical axis direction (φ=0) from a point that is on an optical axis and on the focal plane of the lenticular lens array is incident on the diffusing layer along the optical axis, where the light is diffused and is allowed to leave, with a relative intensity of 1 in the optical axis direction.

On the other hand, light emitted at an angle φ from a point on the focal plane of the lenticular lens array is incident on the diffusing layer at a position P (φ) that is at a distance of tan(φ)×t2 from the optical axis on the diffusing layer, and thereafter, it is diffused with a direction satisfying θ−a sin(n×sin(φ)) as a main orientation direction. An optical-axis-direction component of the diffused light is f(θ) according to a diffusion intensity distribution of the diffusing layer 8212.

When observed from the optical axis direction, a light intensity of the portion viewed from the position P(φ) is f(θ), and consequently, it is observed as a spot with a profile as shown in the right side of FIG. 14.

Now, let θ satisfying f(θ)=1/10 be γ:

$$f(\gamma)=1/10$$

Then, a medium angle γi corresponding to the observation angle γ is derived from an equation below:

$$\gamma i = a\sin(\sin(\gamma)/n)$$

Figure 15A:
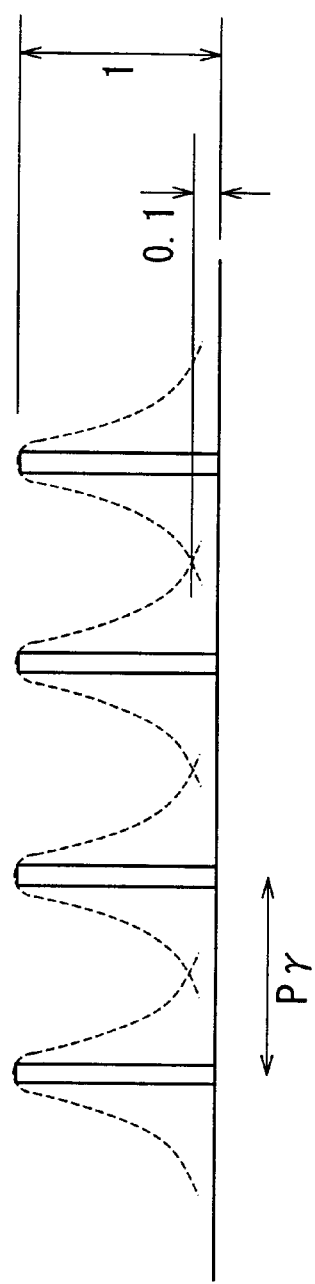
FIGS. 15A and 15B are views for explaining a modulation degree according to the range of a beam spot in the case of the rear-projection display according to one embodiment of the aspect II of the present invention.
Figure 15B:
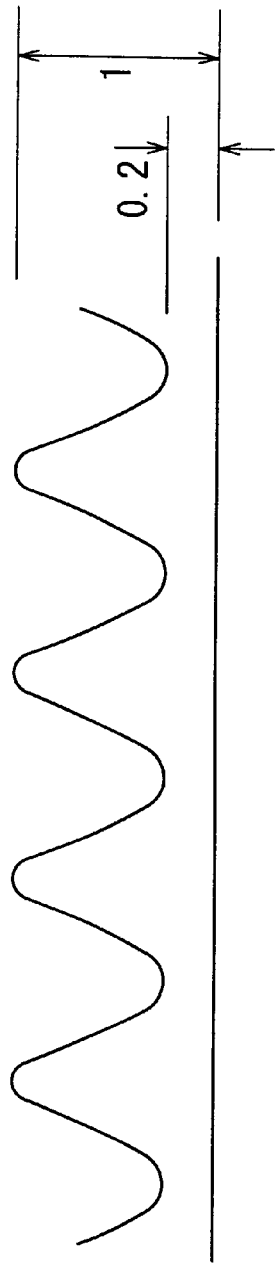

FIGS. 15A and 15B show profiles of an image observed upon assumed inputs in a pulse form with intervals Pγ satisfying Pγ=2×tan(γi)×t2.

Image signals in the pulse form results in beam spots with profiles shown with broken lines, respectively, due to the aforementioned mechanism (FIG. 15A).

Since the pitch interval Pγ is set as described above, the beam spots cross each other at a middle point between the image signals where a relative intensity of 0.1 is obtained.

The observer in the optical axis direction observes an image as shown in FIG. 15B, with these beam spots overlapping each other. Since an intensity at a position at a distance of Pγ from an image position of each beam spot can be regarded as substantially zero, a peak value of the image pattern is approximately 1, and a bottom value thereof is approximately 0.2 of the peak value.

A degree of modulation M of an image pattern is derived generally as:

$$M=(\text{Peak Value}-\text{Bottom Value})/(\text{Peak Value}+\text{Bottom Value})$$

Therefore, a degree of modulation of the image pattern shown in FIG. 15B is 0.8/1.2≈0.67.

Therefore, the degree of modulation is not less than 0.67 when the pitch of the input image signal is not less than the foregoing Pγ, while the degree of modulation is less than 0.67 when the pitch of the input image signal is less than the foregoing Pγ.

Generally, a resolution limit is a degree of modulation of 10%, but a degree of modulation of not less than about 70% is required so as to suppress a decrease in the resolving power to an undetectable level.

In the foregoing description, a pulse-form input is assumed so as to simplify the model for clarification of the discussion, but an actual modulation signal of a display element is in a rectangular form. A signal pitch of the maximum spatial frequency signal that a rear-projection display having a pixel structure with a pitch Pg is capable of presenting is 2×Pg, but taking a width of the foregoing rectangle into consideration, the pixel pitch Pg is equivalent to a signal interval in the case where the foregoing pulse-form input is assumed. Therefore, the requirements:

$$P\gamma \leq Pg$$

$$2\times\tan(\gamma i)\times t2 \leq Pg$$

$$t2 \leq Pg/2/\tan(\gamma i)$$

cause a degree of modulation corresponding to an input signal of the maximum spatial frequency 1/(2×Pg) that the display is capable of presenting to be not less than 0.67.

Since the rear-projection display according to the aspect II of the present invention is configured so that the distance t2 from the focal plane of the lenticular lens array to the image-observed-side surface of the diffusing layer 8212 satisfies the foregoing expressions of relationships, the rear-projection display excels in resolution, having a degree of modulation of 0.67 even with respect to the maximum spatial frequency of 1/(2×Pg) that the device is capable of presenting.

Furthermore, since the distance t1 between the light-projected-side surface of the diffusing layer 8212 and the focal plane of the lenticular lens array is set so as to be not less than f1, scintillation can be reduced significantly as compared with the case where the diffusion layer is provided in the vicinity of the focal plane. Though conventionally a diffusing material is mixed in the Fresnel lens sheet so as to reduce scintillation, this configuration either makes the addition of the diffusing material unnecessary or allows the quantity of the diffusing material mixed therein to decrease significantly. Therefore, the drawback in that the efficiency lowers due to the diffusing material mixed in the Fresnel lens sheet and the drawback in that the resolving power rapidly decreases in the case where an air gap is produced can be avoided or reduced significantly.

Embodiment II-3

The foregoing description is made from the viewpoint of making the best use of the display capability of the display element used in the device, and the following description will depict an embodiment of a rear-projection screen according to the aspect II of the present invention that achieves a resolving power necessary from the viewpoint of the human visual performance.

The configuration of the screen per se is the same as that shown in FIG. 11, and to suppress scintillation, like in the embodiments II-1 and II-2, the distance t1 between the light-projected-side surface of the diffusing layer 8212 and the focal plane of the lenticular lens array is set as described below.

$$t1 \geq f1$$

The human visual acuity is expressed by a reciprocal of a value that is obtained by converting a resolvable interval into an angle in units of minutes. For instance, the visual acuity is 1 when the resolving power of eyes corresponds to 1 minute as an angle, the visual acuity is 2 when the resolving power of eyes corresponds to 0.5 minute as an angle, and the visual acuity is 0.5 when the resolving power of eyes corresponds to 2 minutes as an angle.

On the other hand, a rear-projection projector is suitable for a large-size screen, and mainly applied to a large screen with a diagonal of not less than 50 inches. Generally, a visual range suitable for image observation is three times a height of a screen. Since a 50-inch-diagonal screen with an aspect ratio of 4:3 has a height of approximately 0.75 m, a suitable visual range is approximately 2.3 m.

A width Ps that corresponds to an average human visual acuity of 1 and a distance of 2.3 m is:

$$Ps=2.3\ m\times\tan(1\ \text{minute})\approx 0.7\ mm$$

As long as a rear-projection screen is capable of resolving an interval of 0.7 mm sufficiently, the rear-projection screen is considered to have a sufficient resolving power irrespective of the number of pixels of a display element used in a rear-projection display.

As to a rear-projection screen according to the aspect II of the present invention, a distance t2 between an image-observed-side surface of the diffusing layer 8212 to the focal plane of the lenticular lens array is set as shown below, so that a range Db of a beam spot corresponding to input signals in a pulse form is not more than Ps=0.7 mm:

$$Db = t2 \times P1/f1 \leq 0.7 \text{ mm}$$

$$t2 \leq 0.7 \text{ mm}/P1 \times f1$$

With the setting as above, a rear-projection screen is capable of resolving an interval of 0.7 mm sufficiently. Therefore it has a sufficient resolving power irrespective of the number of pixels of a display element used in rear-projection display.

Furthermore, since the distance t1 between the light-projected-side surface of the diffusing layer 8212 and the focal plane of the lenticular lens array is set to be not less than f1, scintillation can be reduced significantly as compared with the case where the diffusing layer is provided in the vicinity of the focal plane. Though conventionally a diffusing material is mixed in the Fresnel lens sheet so as to reduce scintillation, this configuration either makes the addition of the diffusing material unnecessary or allows the quantity of the diffusing material mixed therein to decrease significantly. Therefore, the drawback in that the efficiency lowers due to the diffusing material mixed in the Fresnel lens sheet and the drawback in that the resolving power rapidly decreases in the case where an air gap is produced can be avoided or reduced significantly.

Embodiment II-4

Furthermore, in the case where a vertical visual angle is limited by decreasing an angle of diffusion by the diffusing layer 8212 so as to give precedence to a normal-direction luminance, requirements for preventing the resolving power from decreasing can be defined with the same indices as those of the theory in Embodiment II-2 above.

In this case as well, the rear-projection display has the same configuration as shown in FIG. 11, and like in Embodiment II-1, to suppress scintillation, the distance t1 between the light-projected-side surface of the diffusing layer 8212 and the focal plane of the lenticular lens array is set as described below:

$$t1 \geq f1$$

As shown in Embodiment II-3, a resolution interval required of a rear-projection screen is 0.7 mm.

As to a rear-projection screen according to the aspect II of the present invention, a distance t2 between an image-observed-side surface of the diffusing layer 8212 to the focal plane of the lenticular lens array is set as shown below, by substituting 0.7 mm for the signal interval 2×Pg corresponding to the maximum spatial frequency that the rear-projection display depicted in the description of Embodiment II-2 is capable of presenting:

$$2 \times \tan(\gamma i) \times t2 \leq 0.7 \text{ mm}$$

$$t2 \leq 0.35 \text{ mm}/\tan(\gamma i)$$

With the setting as above, a rear-projection screen is capable of resolving an interval of 0.7 mm sufficiently. Therefore it has a sufficient resolving power irrespective of the number of pixels of a display element used in rear-projection display.

Furthermore, since the distance t1 between the light-projected-side surface of the diffusing layer 8212 and the focal plane of the lenticular lens array is set to be not less than f1, scintillation can be reduced significantly as compared with the case where the diffusing layer is provided in the vicinity of the focal plane. Though conventionally a diffusing material is mixed in the Fresnel lens sheet so as to reduce scintillation, this configuration either makes the addition of the diffusing material unnecessary or allows the quantity of the diffusing material mixed therein to decrease significantly. Therefore, the drawback in that the efficiency lowers due to the diffusing material mixed in the Fresnel lens sheet and the drawback in that the resolving power rapidly decreases in the case where an air gap is produced can be avoided or reduced significantly.

EXAMPLES

The following description will depict examples of the aspect II of the present invention, along with comparative examples.

In each of the examples and comparative examples, a display element with 720 pixels in the vertical direction× 1280 pixels in the horizontal direction was used as a projection system, and an image was projected by 7% over-scan to a 52-inch-diagonal screen with an aspect ratio of 16:9 (648 mm in the vertical direction×1151 mm in the horizontal direction).

Therefore, a pixel pitch Pg on the screen was 0.96 mm.

Furthermore, a lenticular lens film was made of an acrylic resin with a refractive index n=1.5, and a lenticular lens pitch P1 and a maximum light-exiting angle due to lens refraction were set to be 0.15 mm and 45° (in-medium equivalent angle of 28°), respectively. With the foregoing setting, the distance f1 between the valleys and the focal plane of the lenticular lens array was approximately 0.14 mm.

The lenticular lens film 822 had a thickness set so that the light-exiting surface coincided with the focal plane, and light absorbing layers (black stripes) 8222 with a width of 100 μm (⅔ of a lenticular lens pitch) each were provided on the light non-transmission portions of the light-exiting surface.

In the examples and comparative examples described below, the lenticular lens films 822 were used so that laminated lenticular lens sheets 82 that differed in conditions of the diffusing layers 8212 were produced.

Example 1

A pellet made of an acrylic resin with a refractive index of approximately 1.5 as a base in which were dispersed light diffusing microparticles with an average particle diameter of approximately 6 μm made of a MS resin (copolymer of MMA and styrene) with a refractive index of 1.55, and a pellet made of an acrylic resin alone, were extruded by different extruders, and were laminated inside a die, so that a diffusing sheet with a thickness of 2 mm having a two-layer structure including a 0.1 mm-thick diffusing layer and a 1.9 mm-thick transparent layer was formed. Parallel light was projected to the diffusing sheet so that a luminance distribution of diffused light was measured. Consequently, characteristics described below were detected. An angle α described below is an angle from the normal direction that expresses a direction in which the luminance declines to ½ of a luminance measured in the normal direction, and likewise γ is an angle from the normal direction that expresses a direction in which the luminance declines to ¹⁄₁₀ of the same:

α: 16°

γ: 38°

Values αi and γi obtained by converting the foregoing into an in-medium angle are:

αi: 11°

γi: 24°

The foregoing diffusing sheet and lenticular lens film were laminated with a 0.3 mm-thick transparent sheet made of a transparent material with a refractive index of 1.5 being interposed therebetween, using a 0.025 mm-thick adhesive, so that a laminated lenticular lens sheet was formed. An adhesion surface of the lenticular lens film was the light-exiting surface on which the black stripes were provided. An adhesive surface of the diffusing sheet was a surface on a diffusing-layer-provided side.

In the foregoing configuration, a distance t1 between the light-exiting surface of the lenticular lens film as the focal plane of the lenticular lens array and a light-projected-side surface of the diffusing layer was 0.35 mm, which was sufficiently greater than f1=0.14 mm (2.5 times).

Furthermore, a distance t2 from the focal plane to an image-observed-side surface of the diffusing layer was 0.45 mm. A beam equivalent width Db derived from this value and the aforementioned P1 and f1 was:

$$Db=t2\times P1/f1=0.48 \text{ mm}$$

which was sufficiently smaller than the pixel pitch Pg=0.96 mm (i.e., one-half).

As shown in FIG. 11, a Fresnel lens sheet matched with the focal distance of the projection system was provided at an image-formed plane of the projection system, and the laminated lenticular lens sheet was provided on an image-observed side of the Fresnel lens sheet, so that an image was observed. As a Fresnel lens sheet, a transparent one containing no diffusing material in its base was used (with a haze value of not more than 3%).

Consequently, excellent suppression of scintillation and a high resolving power were achieved.

Example 2

A diffusing sheet having characteristics described below was produced through the same process as described above concerning Example 1, by decreasing the mix proportion of the light diffusing particles. Thicknesses of the diffusing layer and the transparent layer were 0.1 mm and 1.9 mm, respectively, as in Example 1.

α=9°

γ=20°

Values αi and γi obtained by converting the foregoing into an in-medium angle are:

αi: 6°

γi: 13°

The foregoing diffusing sheet and lenticular lens film were laminated with a 1 mm-thick acryl sheet being interposed therebetween, using a 0.025 mm-thick adhesive as in Example 1, so that a laminated lenticular lens sheet was formed.

In the foregoing configuration, a distance t1 between the light-exiting surface of the lenticular lens film as the focal plane of the lenticular lens array and a light-projected-side surface of the diffusing layer was 1.05 mm, which was sufficiently greater than f1=0.14 mm (not less than 7 times).

Furthermore, a distance t2 from the focal plane to the image-observed-side surface of the diffusing layer was 1.15 mm. A maximum signal pitch Pγ such that a degree of modulation derived from the foregoing value of the distance t2 and the aforementioned γi was not less than 0.75 was:

$$P\gamma=2\times t2\times \tan(\gamma i)=0.53 \text{ mm}$$

which was sufficiently smaller than the pixel pitch Pg=0.96 mm (about one-half).

This laminated lenticular lens sheet and a transparent Fresnel lens sheet, as in Example 1, were combined, and an image was observed by utilizing the aforementioned projection system. Consequently, excellent suppression of scintillation and a high resolving power were achieved.

Comparative Example 1

The same diffusing sheet as that was used in Example 1 was laminated directly on the lenticular lens film without providing a transparent sheet therebetween, utilizing an adhesive material, so that a laminated sheet was produced.

In the foregoing configuration, a distance t1 between the light-exiting surface of the lenticular lens film as the focal plane of the lenticular lens array and a light-projected-side surface of the diffusing layer was 0.025 mm, which was significantly smaller than f1=0.14 mm described above.

Furthermore, a distance t2 from the focal plane to an image-observed-side surface of the diffusing layer was 0.125 mm. A beam equivalent width Db derived from this value and the aforementioned P1 and f1 was:

$$Db=t2\times P1/f1=0.13 \text{ mm}$$

which was sufficiently smaller than the pixel pitch Pg=0.96 mm.

This laminated sheet and a transparent Fresnel lens sheet, as in Examples 1 and 2, were combined, and an image was observed by utilizing the aforementioned projection system. Consequently, a sufficient resolving power was obtained, while extremely intense scintillation was observed and a low-quality image was obtained.

Comparative Example 2

The same image observation was carried out utilizing a combination of the same laminated lenticular lens sheet as that used in Comparative Example 1 and the Fresnel lens sheet in whose base a diffusing material was dispersed, and the projection system described above. A haze value, an index often used for quantifying a relatively slight diffusivity, of the base material of this Fresnel lens sheet was approximately 50%.

First of all, the observation was carried out in a state in which the Fresnel lens sheet and the laminated lenticular lens sheet were tightly close to each other. Though an effect in reducing scintillation was observed, still more intense scintillation was observed as compared with Examples 1 and 2. In this state, a sufficient-level resolving power was obtained.

Next, the observation was carried out in a state in which the Fresnel lens sheet and the laminated lenticular lens sheet were provided with a gap of 3 mm. Such a gap can be produced when the temperature and the moisture change. In this state, scintillation was reduced to a substantially undetectable level, but the resolving power obviously was impaired and a blurry image was obtained.

Furthermore, a luminance of the projected light upon exiting was 92% of that in the case where the transparent Fresnel lens sheet as in Examples 1 and 2 and comparative example 1 was used, which means that a transmission loss of 8% was confirmed.

Comparative Example 3

The diffusing sheet used in Example 1 was made to adhere to a lenticular lens film by the same means so that the diffusing layer of the diffusing sheet came to the image-observed side, so that a laminated lenticular lens sheet was produced.

In the foregoing configuration, a distance t1 between the light-exiting surface of the lenticular lens film as the focal plane of the lenticular lens array and a light-projected-side surface of the diffusing layer was 1.925 mm, which was significantly greater than f1=0.14 mm described above.

Furthermore, a distance t2 from the focal plane to an image-observed-side surface of the diffusing layer was 2.025 mm. A beam equivalent width Db derived from this value and the aforementioned P1 and f1 was:

$$Db = t2 \times P1/f1 = 2.2 \text{ mm}$$

which was greater than the pixel pitch Pg=0.96 mm.

This laminated lenticular lens sheet and a transparent Fresnel lens sheet, as in Examples 1 and 2 and Comparative Example 1, were combined, and an image was observed by utilizing the aforementioned projection system. Consequently, scintillation was reduced to a substantially undetectable level, but the resolving power obviously was impaired and a blurry image was obtained.

Set conditions and evaluation results of the Examples and Comparative Examples described above are shown in Table 2. Table 3 explains criteria of ○, Δ, x given as to judgment conditions and evaluation results shown in Table 2.

rather than by the foregoing description, and all changes which come within the meaning and range of equivalency of the claims are intended to be embraced therein.

What is claimed is:

1. A rear-projection screen, comprising at least a lenticular lens sheet and a Fresnel lens sheet,
    wherein the lenticular lens sheet comprises, in a base material thereof made of a resin, light diffusing microparticles made of a resin having a refractive index different from a refractive index of the base material,
    wherein the light diffusing microparticles satisfy Formula I-1 below:

$$0.5 \,\mu m \leq \Delta N1 \times d1 \leq 0.9 \,\mu m \qquad \text{Forumula I-1:}$$

where $\Delta N1$ represents a difference between a refractive index of the light diffusing microparticles and a refractive index of the base material of the lenticular lens sheet, and d1 represents an average particle diameter of the light diffusing microparticles; and
    wherein a refractive index n1 and an Abbe constant v1 of the material forming the light diffusing microparticles and a refractive index n2 and an Abbe constant v2 of the base material in which the light diffusing microparticles are dispersed satisfy Formula I-3 below:

TABLE 2

| | | Mark | Unit | Examples 1 | Examples 2 | Comparative Examples 1 | Comparative Examples 2 | Comparative Examples 3 |
|---|---|---|---|---|---|---|---|---|
| Setting | Pixel Pitch on Screen | Pg | mm | 0.96 | 0.96 | 0.96 | 0.96 | 0.96 |
| | Lenticular Lens Pitch | Pl | mm | 0.15 | 0.15 | 0.15 | 0.15 | 0.15 |
| | Distance from Valley to Focal Plane of Lenticular Lens Array | fl | mm | 0.14 | 0.14 | 0.14 | 0.14 | 0.14 |
| | Distance from Focal Plane to Light-Projected-Side Surface of Diffusing Layer | t1 | mm | 0.35 | 1.05 | 0.025 | 0.025 | 1.925 |
| | Distance from Focal Plane to Image-Observed-Side Surface of Diffusing Layer | t2 | mm | 0.45 | 1.15 | 0.125 | 0.125 | 2.025 |
| | Diffusion Angle (Luminance Declining to ¹⁄₁₀) | γ | deg | 38 | 20 | 38 | 38 | 38 |
| | Refractive Index of Transparent Medium | n | — | 1.5 | 1.5 | 1.5 | 1.5 | 1.5 |
| | In-Medium Equivalent Angle | γi | deg | 24 | 13 | 24 | 24 | 24 |
| | Fresnel Lens Base Material Haze Value | h | % | <3 | <3 | <3 | 50 | <3 |
| Performance Indices | Index (1) | fl | mm | 0.15 | 0.15 | 0.15 | 0.15 | 0.15 |
| | Index (2) | fl × Pg/Pl | mm | 0.90 | 0.90 | 0.90 | 0.90 | 0.90 |
| | Index (3) | Pg/2/tan(γi) | mm | 1.07 | 2.05 | 1.07 | 1.07 | 1.07 |
| Judgment Conditions | Condition (1) | t1 > fl | — | ○ | ○ | X | X | ○ |
| | Condition (2) | t2 < fl × Pg/Pl | — | ○ | X | ○ | ○ | X |
| | Condition (3) | t2 < Pg/tan(γi) | — | ○ | ○ | ○ | ○ | X |
| Evaluation Results | Scintillation | | — | ○ | ○ | X | Δ | ○ |
| | Resolving Power | Lenti/Fresnel Tightly Close | — | ○ | ○ | ○ | ○ | X |
| | | Lenti/Fresnel with Gap of 3 mm | — | ○ | ○ | ○ | X | X |

TABLE 3

| Judgment Conditions | ○ Condition satisfied |
| --- | --- |
| | x Condition not satisfied |
| Evaluation Results | Scintillation | ○ Detectable limit or lower |
| | | Δ Reduced as compared with x but insufficient |
| | | x Intense, resulting in low-quality image |
| | Resolving Power | ○ Not inferior to front-projection-type |
| | | x Inferior to front-projection-type |

The invention may be embodied in other forms without departing from the spirit or essential characteristics thereof. The embodiments disclosed in this application are to be considered in all respects as illustrative and not limiting. The scope of the invention is indicated by the appended claims $$(n1-n2) \times (v1-v2) < 0 \qquad \text{Formula I-3.}$$

2. A rear-projection screen comprising at least a light diffusing sheet, a lenticular lens sheet, and a Fresnel lens sheet,
    wherein the light diffusing sheet comprises, in a base material thereof made of a resin, light diffusing microparticles made of a resin having a refractive index different from a refractive index of the base material,
    wherein the light diffusing microparticles satisfy Formul I-2 below:

$$0.5 \,\mu m \leq \Delta N1 \times d1 \leq 0.9 \,\mu m \qquad \text{Forumula I-1:}$$

where $\Delta Np$ represents a difference between a refractive index of the light diffusing microparticles and a refractive index of the base material of the light diffusing sheet, and dp represents an average particle diameter of the light diffusing microparticles; and wherein a refractive index n1 and an Abbe constant ν1 of the material forming the light diffusing microparticles and a refractive index n2 and an Abbe constant ν2 of the base material in which the light diffusing microparticles are dispersed satisfy Formula I-3 below:

$$(n1-n2) \times (\nu1-\nu2) < 0 \qquad \text{Formula I-3.}$$

3. The rear-projection screen according to claim 1, wherein:

the Fresnel lens sheet comprises, in a base material thereof made of a resin, light diffusing microparticles made of a resin having a refractive index different from a refractive index of the base material;

diffusion of light caused by the light diffusing microparticles contained in the Fresnel lens sheet is smaller than diffusion of light caused by the light diffusing microparticles contained in the lenticular lens sheet; and the light diffusing microparticles contained in the Fresnel lens sheet satisfy Formula I-4 below:

$$0.1\ \mu m \leq \Delta Nf \times df \leq 0.3\ \mu m \qquad \text{Formula I-4}$$

where $\Delta Nf$ represents a difference between a refractive index of the light diffusing microparticles contained in the Fresnel lens sheet and a refractive index of the base material of the Fresnel lens sheet, and df represents an average particle diameter of the light diffusing microparticles contained in the Fresnel lens sheet.

4. The rear-projection screen according to claim 2, wherein:

the Fresnel lens sheet comprises, in a base material thereof made of a resin, light diffusing microparticles made of a resin having a refractive index different from a refractive index of the base material;

diffusion of light caused by the light diffusing microparticles contained in the Fresnel lens sheet is smaller than diffusion of light caused by the light diffusing microparticles contained in the lenticular lens sheet; and the light diffusing microparticles contained in the Fresnel lens sheet satisfy Formula I-4 below:

$$0.1\ \mu m \leq \Delta Nf \times df \leq 0.3\ \mu m \qquad \text{Formula I-4}$$

where $\Delta Nf$ represents a difference between a refractive index of the light diffusing microparticles contained in the Fresnel lens sheet and a refractive index of the base material of the Fresnel lens sheet, and df represents an average particle diameter of the light diffusing microparticles contained in the Fresnel lens sheet.

5. The rear-projection screen according to claim 1, wherein:

the lenticular lens sheet contains the light diffusing microparticles satisfying Formula I-1 as a main diffusing element, and further contains, as a sub diffusing element, light diffusing microparticles that are made of a resin having a refractive index different from that of the base material of the lenticular lens sheet and that satisfy Formula I-5 below:

$$0.1\ \mu m \leq \Delta Ns \times ds \leq 0.3\ \mu m \qquad \text{Formula I-5}$$

where $\Delta Ns$ represents a difference between a refractive index of the light diffusing microparticles serving as the sub diffusing element and a refractive index of the base material containing the same, and ds represents an average particle diameter of the light diffusing microparticles serving as the sub diffusing element.

6. The rear-projection screen according to claim 2, wherein the light diffusing sheet contains the light diffusing microparticles satisfying Formula I-2 as a main diffusing element, and further contains, as a sub diffusing element, light diffusing microparticles that are made of a resin having a refractive index different from that of the base material of the light diffusing sheet and that satisfy Formula I-5 below:

$$0.1\ \mu m \leq \Delta Ns \times ds \leq 0.3\ \mu m \qquad \text{Formula I-5}$$

where $\Delta Ns$ represents a difference between a refractive index of the light diffusing microparticles serving as the sub diffusing element and a refractive index of the base material containing the same, and ds represents an average particle diameter of the light diffusing microparticles serving as the sub diffusing element.

7. The rear-projection screen according to claim 6, wherein an average particle diameter dm and a mix proportion by volume Am of the light diffusing microparticles as the main diffusing element, a thickness tm of a layer of the base material containing the light diffusing microparticles as the main diffusing element, a difference $\Delta Nm$ between a refractive index of the light diffusing microparticles as the main diffusing element and a refractive index of the base material containing the light diffusing microparticles as the main diffusing element, an average particle diameter ds and a mix proportion by volume As of the light diffusing microparticles as the sub diffusing element, a thickness ts of a layer of the base material containing the light diffusing microparticles as the sub diffusing element, a difference $\Delta Ns$ between a refractive index of the light diffusing microparticles as the sub diffusing element and a refractive index of the base material containing the light diffusing microparticles as the sub diffusing element are set so as to satisfy Formula I-6 below:

$$Am \times tm/dm \times \Delta Nm > As \times ts/ds \times \Delta Ns \qquad \text{Formula I-6.}$$

8. The rear-projection screen according to claim 1, wherein a lenticular lens array whose lengthwise direction is directed in a horizontal direction is provided on a light-projected-side surface of the Fresnel lens sheet.

9. A rear-projection display comprising a rear-projection screen according to claim 1.

10. The rear-projection screen according to claim 6, wherein an average particle diameter dm and a mix proportion by volume Am of the light diffusing microparticles as the main diffusing element, a thickness tm of a layer of the base material containing the light diffusing microparticles as the main diffusing element, a difference $\Delta Nm$ between a refractive index of the light diffusing microparticles as the main diffusing element and a refractive index of the base material containing the light diffusing microparticles as the main diffusing element, an average particle diameter ds and a mix proportion by volume As of the light diffusing microparticles as the sub diffusing element, a thickness ts of a layer of the base material containing the light diffusing microparticles as the sub diffusing element, a difference $\Delta Ns$ between a refractive index of the light diffusing micropar ticles as the sub diffusing element and a refractive index of the base material containing the light diffusing microparticles as the sub diffusing element are set so as to satisfy Formula I-6 below:

$$Am \times tm/dm \times \Delta Nm > As \times ts/ds \times \Delta Ns \qquad \text{Formula I-6.}$$

11. The rear-projection screen according to claim 2, wherein a lenticular lens array whose lengthwise direction is directed in a horizontal direction is provided on a light-projected-side surface of the Fresnel lens sheet.

12. A rear-projection display comprising a rear-projection screen according to claim 2.

* * * * *

UNITED STATES PATENT AND TRADEMARK OFFICE
CERTIFICATE OF CORRECTION

PATENT NO. : 6,665,118 B2
DATED : December 16, 2003
INVENTOR(S) : Yamaguchi et al.

It is certified that error appears in the above-identified patent and that said Letters Patent is hereby corrected as shown below:

Column 34,
Line 64, formula "I-1" should read -- I-2 --.
Line 64, "$N1xd1$" should read -- $Npxdp$ --.

Signed and Sealed this

Fifteenth Day of November, 2005

JON W. DUDAS
*Director of the United States Patent and Trademark Office*